(12) United States Patent
Cetindag

(10) Patent No.: US 9,284,732 B2
(45) Date of Patent: Mar. 15, 2016

(54) MODULAR STRUCTURE AND SAID MODULAR STRUCTURE'S STRUCTURAL MEMBERS MADE OF COMPOSITE MATERIAL

(71) Applicant: Renco Kompozit Teknolojileri Sanayi ve Ticaret Limited Sirketi, Istanbul (TR)

(72) Inventor: Sedat Cetindag, Istanbul (TR)

(73) Assignee: Renco World Corporation, Miami, FL (US)

( * ) Notice: Subject to any disclaimer, the term of this patent is extended or adjusted under 35 U.S.C. 154(b) by 0 days.

(21) Appl. No.: 14/204,253

(22) Filed: Mar. 11, 2014

(65) Prior Publication Data

US 2014/0190106 A1 Jul. 10, 2014

Related U.S. Application Data

(62) Division of application No. 13/640,208, filed as application No. PCT/EP2011/057386 on May 9, 2011, now Pat. No. 9,010,052.

(30) Foreign Application Priority Data

| Jan. 28, 2011 | (TR) | 2011 00796 |
| Jan. 28, 2011 | (TR) | 2011 00797 |
| Mar. 15, 2011 | (TR) | 2011 02464 |
| Mar. 15, 2011 | (TR) | 2011 02466 |
| Apr. 21, 2011 | (TR) | 2011 03899 |

(51) Int. Cl.
*E04B 1/16* (2006.01)
*E04C 2/28* (2006.01)
(Continued)

(52) U.S. Cl.
CPC ... *E04C 2/28* (2013.01); *E04B 2/18* (2013.01); *E04C 3/28* (2013.01); *Y02B 10/30* (2013.01)

(58) Field of Classification Search
CPC ... E04F 13/18; E04F 15/02005; E02D 29/025
USPC ........ 52/309.1, 309.13–309.17, 782.1, 783.1, 52/251, 252, 264, 275, 279, 284, 285.1, 52/285.3
See application file for complete search history.

(56) References Cited

U.S. PATENT DOCUMENTS

| 4,833,856 A | 5/1989 | Zwagerman |
| 5,706,620 A | 1/1998 | De Zen |

(Continued)

FOREIGN PATENT DOCUMENTS

| DE | 29513068 U1 | 1/1996 |
| GB | 2443630 A | 5/2008 |

(Continued)

OTHER PUBLICATIONS

Ruukki more with metals, "Hot-Rolled Steel Places, Sheets and Coils / Standard steel grades, comparison, designations and codes", 6 pages, Copyright 2011.

(Continued)

*Primary Examiner* — William Gilbert
(74) *Attorney, Agent, or Firm* — Lerner, David, Littenberg, Krumholz & Mentlik, LLP

(57) ABSTRACT

The present invention is a structural member made of composite material, characterized by comprising a body which is made of a composite material with at least one type of fiber and at least one type of resin; and at least one connection member which is one piece with said body in order to provide connection to another structural member with the same characteristics. The present invention also relates to modular structures like buildings produced using said structural members.

32 Claims, 18 Drawing Sheets

(51) Int. Cl.
*E04B 2/18* (2006.01)
*E04C 3/28* (2006.01)

(56) References Cited

U.S. PATENT DOCUMENTS

| | | |
|---|---|---|
| 5,987,840 A | 11/1999 | Leppert |
| 6,050,044 A | 4/2000 | McIntosh |
| 6,189,282 B1 | 2/2001 | VanderWerf |
| 6,412,243 B1 | 7/2002 | Sutelan |
| 7,694,485 B1 | 4/2010 | Siener |
| 2002/0148187 A1 | 10/2002 | Walters |
| 2003/0009963 A1 | 1/2003 | Crowell |
| 2003/0170445 A1 | 9/2003 | Parrish |
| 2006/0101752 A1 | 5/2006 | Sakai et al. |
| 2009/0047980 A1 | 2/2009 | Wilson |
| 2010/0096608 A1 | 4/2010 | McCarthy et al. |

FOREIGN PATENT DOCUMENTS

| | | |
|---|---|---|
| WO | 8401792 A1 | 5/1984 |
| WO | 02092928 A1 | 11/2002 |

OTHER PUBLICATIONS

MEsteel—Qualities German DIN 17100 Carbon Steel & Stainless Steel, "DIN 17100 Grade classification and chemical composition of the steels", <http://www.mesteel.com/info/german.htm>, 4 pages, Sep. 30, 2015.

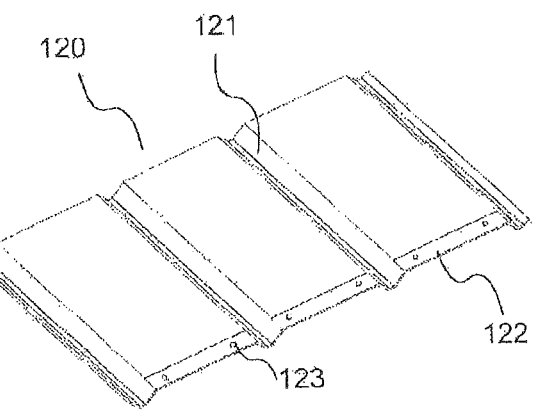
Figure 8a
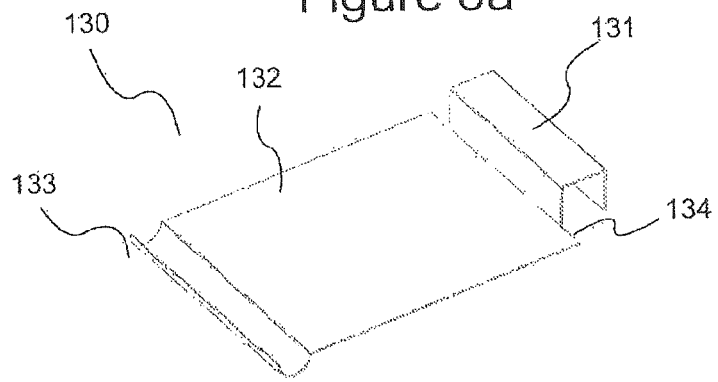
Figure 8b
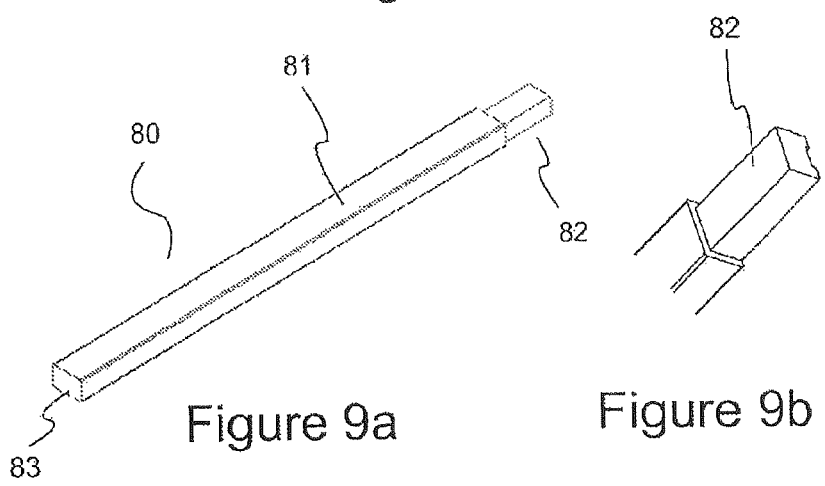
Figure 9a
Figure 9b

MODULAR STRUCTURE AND SAID MODULAR STRUCTURE'S STRUCTURAL MEMBERS MADE OF COMPOSITE MATERIAL

CROSS-REFERENCE TO RELATED APPLICATIONS

The present application is a divisional of U.S. patent application Ser. No. 13/640,208, filed Oct. 9, 2012, which application is a national phase entry under 35 U.S.C. §371 of International Application No. PCT/EP2011/057386 filed May 9, 2011, published on Aug. 2, 2012, as WO 2012/100843 A1, which claims priority from Turkish Patent Application Nos.: 2011/00796, filed Jan. 28, 2011; 2011/00797, filed Jan. 28, 2011; 2011/02464, filed Mar. 15, 2011; 2011/02466, filed Mar. 15, 2011 and 2011/03899, filed Apr. 21, 2011, all of which are incorporated herein by reference.

TECHNICAL FIELD

The present invention relates to structural members made of composite materials and relates to modular structures which are produced using said structural members.

KNOWN STATE OF THE ART

In construction sector, concrete and steel based structures are used widely, in this manner, the insulation of the constructions manufactured in this manner is provided by means of polymeric or plastic foam based materials. Moreover, again, decorative panels, manufactured by these types of materials, are also applied to the buildings.

In parallel to this, in the construction sector where there are increasing competition conditions, more rapid and low cost building methods for realizing construction without compromising the endurance of the buildings are tried to be improved. Particularly, rapid and low cost construction solutions are very important in regions where poor people live and in regions which are subject to disasters like earthquake and flood.

Since, by means of concrete and steel based construction techniques, changing of the buildings, which can not be lived in or which are destroyed in such disasters, with new ones, takes a long time and leads to a very high cost using the present art. Moreover, since the construction of the new buildings takes a very long time, the sufferers suffer during this long time period. Particularly in case of big disasters, in general, new residents can be given only to some of the sufferers.

Because of these reasons and because of pluralities of other reasons, constructional members, made of alternative materials other than concrete or steel forming the carrier member of the building, and buildings which can be built from such constructional members in a rapid manner are required in the construction sector.

Prefabs, which are used in the present art and which are particularly used temporarily, can not meet this object in an exact manner. Since, in prefabs, metal members like box profile are used for providing resistance, moreover, the construction of the prefab is not substantially practical and rapid.

The construction members made of composite materials provide a solution to these problems partially. For instance, in the patent application US2003170445, a composite material is disclosed comprising silica cenosphere and resin. Said composite material can be used for forming the construction units used in modular buildings. However, the structural members disclosed in this patent do not provide a solution in producing the carrier members of the building. Moreover, for the interconnection of the structural members, additional metal connection members are required.

In the patent application US6412243, an ultra-light, modular composite building system is disclosed which is covered by foam. This building comprises rigid and expanded matrix material layers, and thanks to this, a composite structure capable of supporting over three hundred times its own weight can be provided. The ends of said rigid material can be configured so as to be locked in a tools-free manner with the adjacent building components. The resulting composite can form low-cost structural components whose volume mostly comprises air. Since this material is obtained by the lamination of carrier members, which are in plastic pipe like form, by using foam, because of the low resistance values of the foam, this material can not provide the desired resistance against momentum and drawing and pressure forces, moreover, the cost of this material is not as low as desired. Moreover, since said structural member is made of two different materials with different chemical and physical properties, the resistance of a building made of said structural member will be low because of the movements resulting from the different expansion coefficients of the different materials. On the other hand, because of the abovementioned reasons, it is apparent that such a structural member can not be used in the carrier members, like the columns, of a building. Finally, in US6412243, an apparent solution is not disclosed which shows how all of a building will be manufactured by such a structural member.

BRIEF DESCRIPTION OF THE INVENTION

An object of the present invention is to provide the manufacture of structures like building in a very rapid manner and with a low cost by using structural members made of the same type of composite material.

Another object of the present invention is to provide composite structural members which can be connected to each other without using additional connection members or connection apparatus and thanks to this, which provide substantially rigid buildings to be built.

Another object of the present invention is to provide composite structural members which are as resistant as steel and however which are much lighter than steel and which can be manufactured with a much lower cost and which are also used in production of carrier members, like columns, of a building.

Another object of the present invention is to provide composite structural members which can be manufactured from the same composite material where the connection members are also manufactured from the same composite material.

In order to realize all of the abovementioned objects and the objects which are to be obtained from the detailed description below, the present invention is a structural member made of composite material, characterized by comprising a body which is made of a composite material with at least one type of fiber and with at least one type of resin; and at least one connection member which is one piece with said body in order to provide connection to another structural member with the same characteristics.

In a preferred embodiment of the subject matter invention, said body comprises at least one opening which extends at least partially along the body height.

In another preferred embodiment of the subject matter invention, as the connection item, the structural member comprises at least one connection recess on the surface thereof facing another structural member which is horizontally adjacent.

In another preferred embodiment of the subject matter invention, at least some part of said connection recess has a cross section which widens from outside towards inside.

In another preferred embodiment of the subject matter invention, moreover, there is at least one connection member which is not one piece to the structural member, and however, which is made of the same composite material and which has a cross section compliant with the connection housing defined by the connection recesses of two structural members placed side by side.

In another preferred embodiment of the subject matter invention, as the connection item, the structural member comprises at least one connection extension on the surface thereof facing another structural member placed on the body thereof.

In another preferred embodiment of the subject matter invention, as the connection item, there is at least one connection housing which is provided on the base of the body of the structural member so as to correspond the connection extension of the structural member placed thereon.

In another preferred embodiment of the subject matter invention, on the structural member body, there is at least one wall connection part which has pluralities of connection extensions provided side by side so that there is a certain space in between; and optionally pluralities of connection housings provided so as to correspond to the connection extensions of another structural member on the body base.

In another preferred embodiment of the subject matter invention, the structural member comprises a column connection part which has a connection extension at a height which is higher than the connection extensions in the wall connection part and which extends upwardly from the body thereof.

In another preferred embodiment of the subject matter invention, said connection extensions have a cross section defining an opening extending vertically along the height of the structural member.

In another preferred embodiment of the subject matter invention, there is at least one set which is provided so as to partially cover the space remaining between said connection extensions.

In another preferred embodiment of the subject matter invention, there is at least one set housing which is provided on the base of the body thereof and wherein said set, regarding the structural member whereon it is seated, is accommodated.

In another preferred embodiment of the subject matter invention, there is a box like body which has at least one compartment defined by said openings.

In another preferred embodiment of the subject matter invention, as the connection item, the subject matter invention comprises two housing walls extending mutually outwardly from at least one lateral surface of the body thereof; and at least one placement housing which is defined by said housing walls and which has dimensions so that a horizontally adjacent structural member body is able to be placed therein.

In another preferred embodiment of the subject matter invention, there is at least one fixation channel which is provided on at least one of the housing walls of said placement housing.

In another preferred embodiment of the subject matter invention, there is at least one connection tab provided on at least one lateral surface of the structural member so as to correspond to said fixation channel.

In another preferred embodiment of the subject matter invention, as a connection item, there is at least one connection channel and/or connection tab which is/are provided on at least one surface thereof facing the other horizontally adjacent structural member.

In another preferred embodiment of the subject matter invention, in order to provide resistance, the subject matter invention is made of a composite material comprising at least one type of fiber at a proportion of 25-33%, at least one type of mineral powder as filling material with a proportion of 40-50%, at least one type of resin with a proportion of 20-25% as binding member between the fiber and filling material, and at least one chemical additive with a proportion of 5-8%.

In another preferred embodiment of the subject matter invention, in order to obtain a material with the mechanical properties of steels of type ST 50 and above, vinyl ester resin is used as resin and carbon fiber is used as fiber.

In another preferred embodiment of the subject matter invention, in order to obtain a material with the mechanical properties of steels between ST 33 and ST 42, ortho-phthalic resin is used as resin and glass fiber is used as fiber.

In another preferred embodiment of the subject matter invention, in order to obtain a material with the mechanical properties of steels between ST 42 and ST 50, isophtalic resin is used as resin and aramid fiber is used as fiber.

In another preferred embodiment of the subject matter invention, as the filling material, the subject matter invention comprises at least one type of mineral powder which is selected from a mineral group comprising silisium dioxide, barite, talc and calcite.

In another preferred embodiment of the subject matter invention, as chemical additive, the subject matter invention comprises at least one of the chemicals increasing resistance to abrasion, resistance to flame and increasing water absorption; and moreover, optionally, the subject matter invention comprises predetermined amount of thermoplastic material for improving surface appearance.

In another preferred embodiment of the subject matter invention, the subject matter invention is a structure which is obtained by the assembly of the abovementioned structural members. Said structure can preferably be a building, a bridge, a beam, a tower or a cabinet.

The subject matter invention is a modular building which is built by joining composite structural members wherein as structural member, whole of it is made of a composite material comprising at least one type of fiber and at least one type of resin; characterized by comprising:

at least two floor pieces where each of the pieces comprises at least one connection recess on at least one side and which are positioned with respect to each other where one of them corresponds to the connection recess of the other one and thus so as to define a connection housing; and a connection member which is placed to said connection housing, at least two wall adaptors which are placed onto the floor defined by said floor pieces and which comprise a body with at least one opening, at least one connection extension extending upwardly from said body and which comprise at least one connection recess provided on at least one lateral surface of the body and accordingly, which are positioned side by side so as to define a connection housing and where one of them corresponds to the connection recess of the other one; and a connection member which is placed to said connection housing, at least one wall brick which has a body with at least one opening and which has at least one connection housing provided on the base of said body and which has a connection extension extending upwardly from the body and which is placed on said wall adaptor so that the connection extension thereof enters into said connection housing.

In another preferred embodiment of the subject matter building, said wall adaptor comprises at least one wall connection part which has pluralities of connection extensions which are provided side by side so that there is a space in between.

In another preferred embodiment of the subject matter invention, said wall adaptor comprises at least two wall connection parts which extend at a certain angle with respect to each other.

In another preferred embodiment of the subject matter invention, said wall connection parts extend with respect to each other so as to define a wall adaptor which is in an L like or a T like form.

In another preferred embodiment of the subject matter invention, said wall brick comprises at least one wall connection part which has pluralities of connection extensions which are provided side by side so that there is a space in between.

In another preferred embodiment of the subject matter invention, said wall brick comprises at least two wall connection parts which extend at a certain angle with respect to each other.

In another preferred embodiment of the subject matter invention, said wall connection parts extend with respect to each other so as to define a wall brick which is in an L like or a T like form.

In another preferred embodiment of the subject matter invention, the wall brick comprises at least one connection channel and/or connection tab provided on at least one lateral surface thereof facing another horizontally adjacent wall brick.

In another preferred embodiment of the subject matter invention, there is a body which is placed onto the floor defined by said floor pieces and which has at least one opening; at least one connection extension which extends upwardly from said body; a fourth connection extension which extends upwardly from the body and which has a height greater than said connection extension; at least one column adaptor which has at least one connection recess provided on at least one lateral surface of the body and accordingly which is positioned so as to correspond to the connection recesses of the wall adaptor and so as to define a connection housing; and a connection member which is placed to said connection housing.

In another preferred embodiment of the subject matter invention, said column adaptor comprises at least one wall connection part which has pluralities of connection extensions provided side by side so as to have a space in between.

In another preferred embodiment of the subject matter invention, said column adaptor comprises at least two wall connection parts extending at a certain angle with respect to each other.

In another preferred embodiment of the subject matter invention, said wall connection parts extend with respect to each other so as to define a column adaptor which is in an L like or a T like form.

In another preferred embodiment of the subject matter invention, there is a body which is placed on said column adaptor and which is in connection with the wall bricks from at least one side thereof and accordingly which has at least one opening; at least one connection extension which extends upwardly from said body; at least one connection housing which is provided on the base of the body and wherein the connection extension of the wall brick enters; two housing walls which extend mutually outwardly from at least one lateral surface of the body; and at least one corner column which is defined by said housing walls and which comprises at least one placement housing wherein at least some part of a wall brick body is placed.

In another preferred embodiment of the subject matter invention, said placement housing comprises at least one fixation channel which is provided on at least one of the housing walls.

In another preferred embodiment of the subject matter invention, there is at least one connection tab which is provided on at least one lateral surface of the wall brick body so as to enter into said fixation channel.

In another preferred embodiment of the subject matter invention, there is a body; at least one connection housing which is provided on the base of said body; and at least one wall top brick which has at least one connection recess provided on at least one lateral surface of the body and accordingly which is positioned so as to connect at least two adjacent wall brick to each other or so as to connect an adjacent wall brick and an adjacent corner column to each other from above and which is positioned so that the related connection extensions enter into the connection housing.

In another preferred embodiment of the subject matter invention, said wall top brick comprises at least two wall connection parts which extend at a certain angle with respect to each other.

In another preferred embodiment of the subject matter invention, said wall connection parts extend with respect to each other so as to define an wall top brick in an L like or a T like form.

In another preferred embodiment of the subject matter invention, the wall top brick comprises a placement housing whereon the body of another structural member will be placed from above.

In another preferred embodiment of the subject matter invention, there is an eaves adaptor which is placed to said placement housing so as to extend orthogonally to the extension direction of the related wall top brick and which has an upper housing extending in an angled manner in this direction and which has a lower housing extending in a substantially horizontal manner with respect to the ground.

In another preferred embodiment of the subject matter invention, there are pluralities of roof profiles which have a connection extension and which have a connection housing wherein the connection extension of another roof profile can enter, and accordingly, which are engaged to each other so as to form the roof trusses of the building and where the ends of the roof profiles, which are in the lower elevation, enter into said upper and lower housings respectively.

In another preferred embodiment of the subject matter invention, there are additional roof profiles which have a connection extension and which have a connection housing wherein the connection extension of another roof profile can enter, and accordingly, which are engaged to each other so as to form the roof purlins of the building and which intersect with the roof profiles regarding the roof trusses at some points.

In another preferred embodiment of the subject matter invention, there is at least one roof valley which has a connection form with inverse U cross section placed to the wall top bricks; an eaves part which extends essentially parallel to the ground after assembly at the continuation of said connection form; and which has a rainspout.

In another preferred embodiment of the subject matter invention, in the regions where the roof profiles, forming the roof trusses and roof purlins, intersect with each other, there is at least one roof connection adaptor with a support part comprising a placement housing which will support the roof profiles from the bottom.

In another preferred embodiment of the subject matter invention, there is a roof coating with a connection part which is connected to another roof coating as the connection item and which is coated onto the roof trusses and roof purlins defined by the roof profiles.

In another preferred embodiment of the subject matter invention, there is a cover piece which has a placement housing and which is placed onto the wall bricks (60a, 60b, 60c, 60e, 60f) or onto the wall top bricks in desired points.

In another preferred embodiment of the subject matter invention, all of the present structural members are made of a composite material comprising at least one type of fiber with a proportion of 25-33% so as to provide resistance; at least one type of mineral powder with a proportion of 40-50% so as to be used as the filling material; at least one type of resin with a proportion of 20-25% so as to be used as the member binding the fiber to the filling material; and at least one chemical additive with a proportion of 5-8%.

In another preferred embodiment of the subject matter invention, in order to obtain a material with the mechanical properties of steels of type ST 50 and above, vinyl ester resin is used as resin and carbon fiber is used as fiber.

In another preferred embodiment of the subject matter invention, in order to obtain a material with the mechanical properties of steels between ST 33 and ST 42, ortho-phthalic resin is used as resin and glass fiber is used as fiber.

In another preferred embodiment of the subject matter invention, in order to obtain a material with the mechanical properties of steels between ST 42 and ST 50, isophtalic resin is used as resin and aramid fiber is used as fiber.

In another preferred embodiment of the subject matter invention, as the filling material, the subject matter invention comprises at least one type of mineral powder which is selected from a mineral group comprising silisium dioxide, barite, talc and calcite.

In another preferred embodiment of the subject matter invention, as chemical additive, the subject matter invention comprises at least one of the chemicals increasing resistance to abrasion, resistance to flame and increasing water absorption; and moreover, optionally, the subject matter invention comprises predetermined amount of thermoplastic material for improving surface appearance.

Figure 1A:
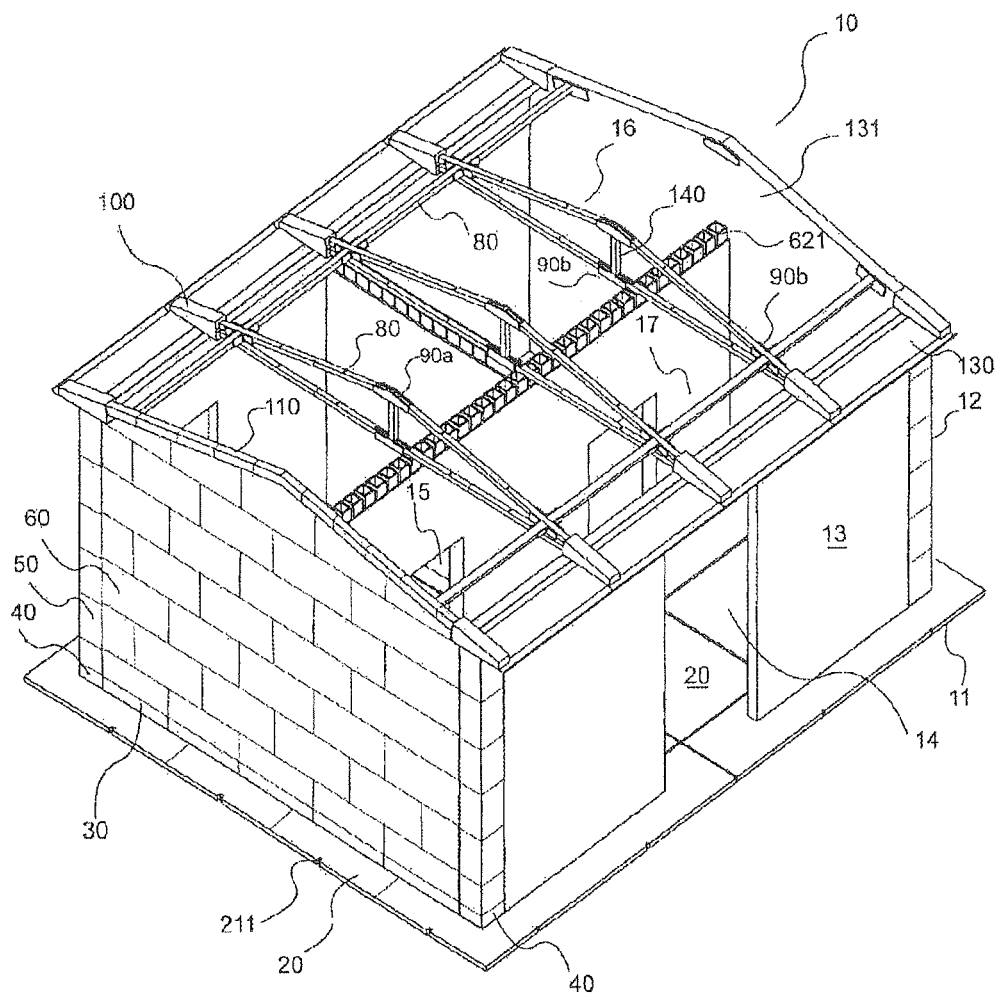
In FIG. 1a, the representative view of a house produced using the subject matter building components is given.
Figure 1B:
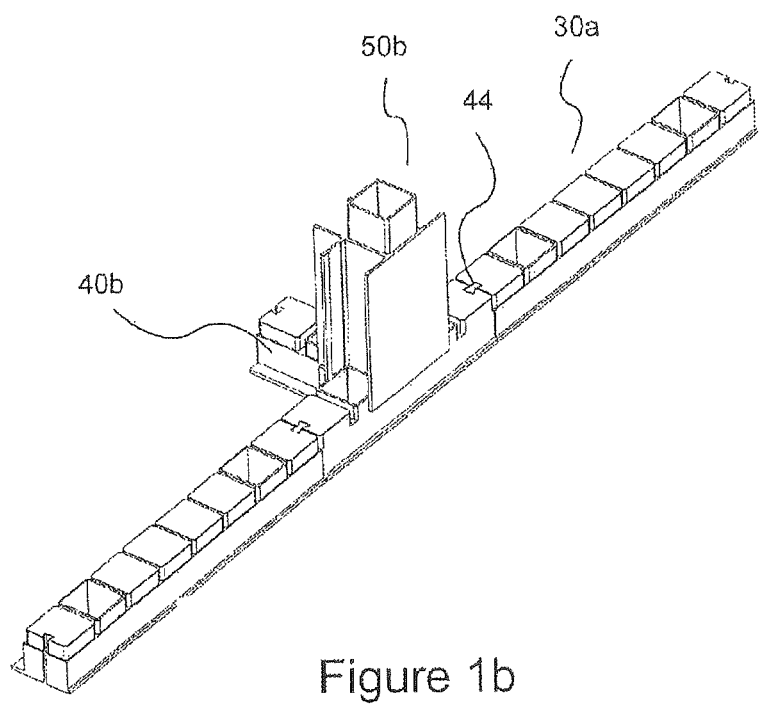
Figure 1C:
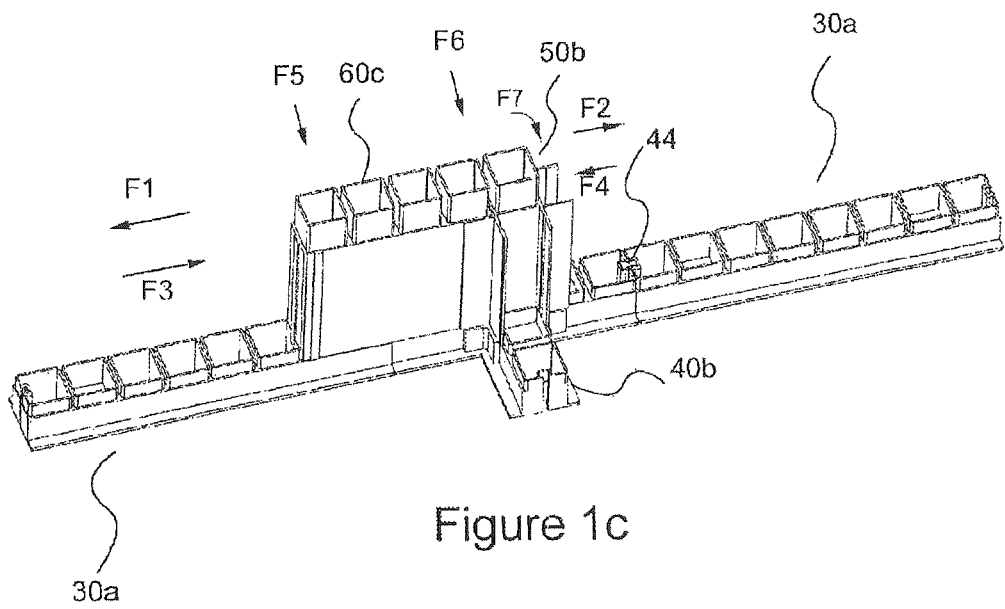
Figure 1D:
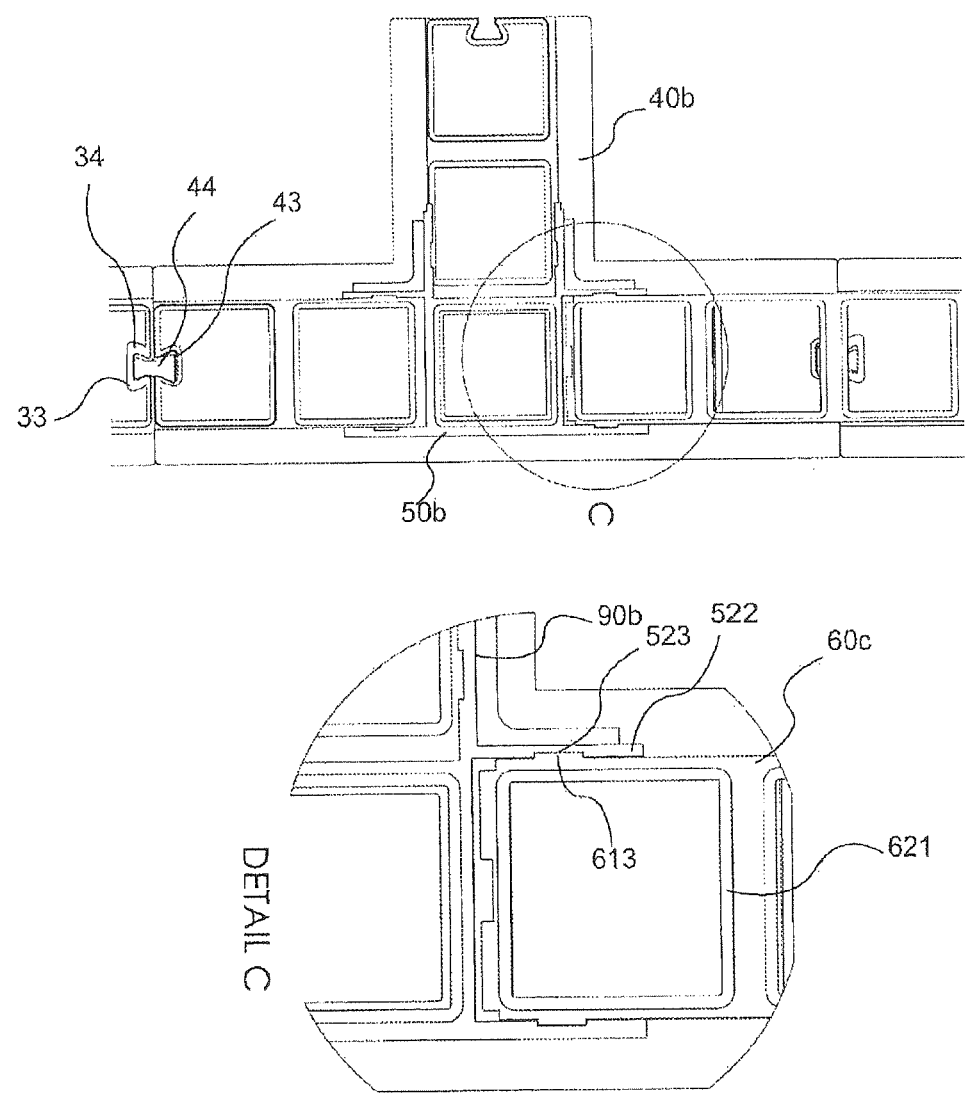
Figure 1E:
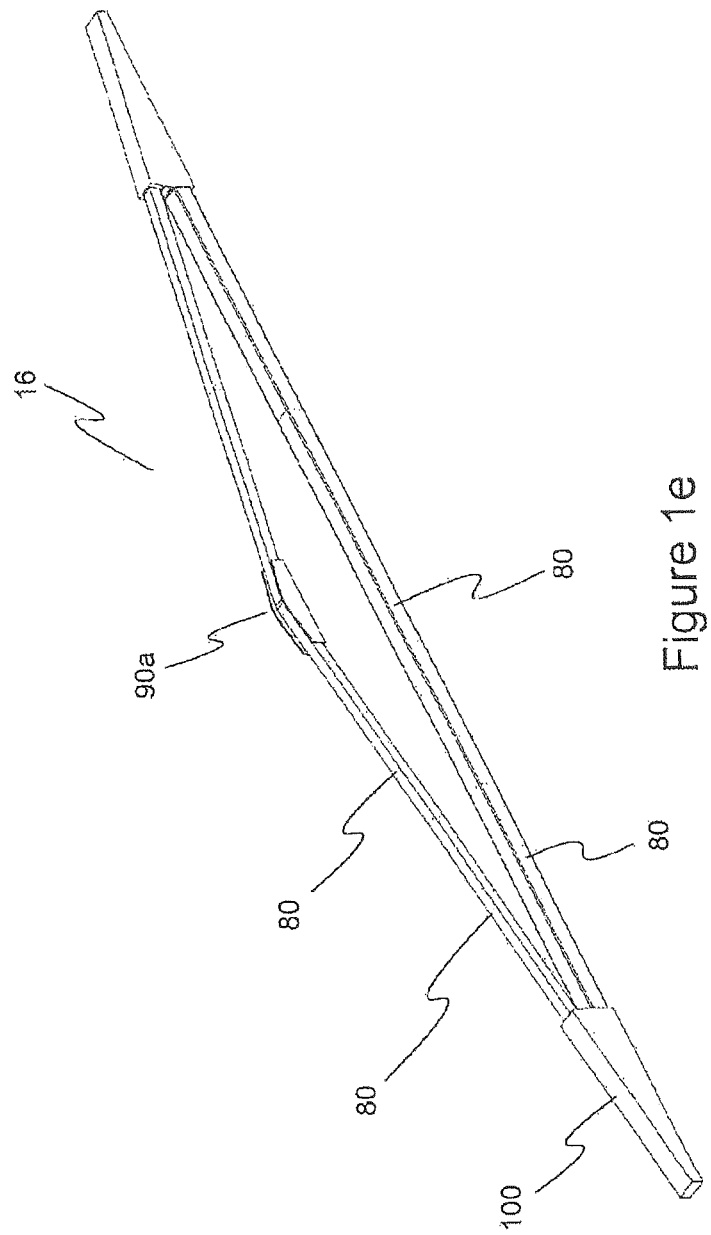
Figure 1F:
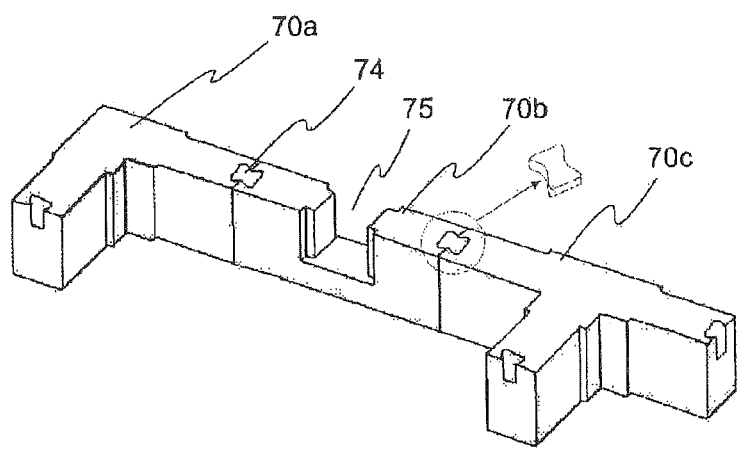
Figure 1G:
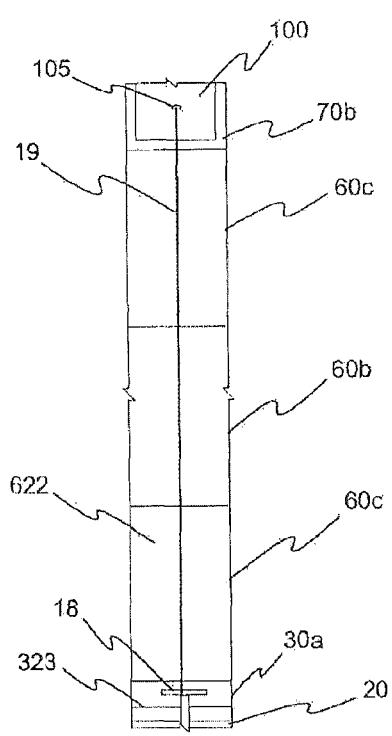

In the figures between FIGS. 1b and 1g, the representative view of the construction steps of the building in FIG. 1a is given, where the construction is realized using the subject matter structural members.

Figure 2A:
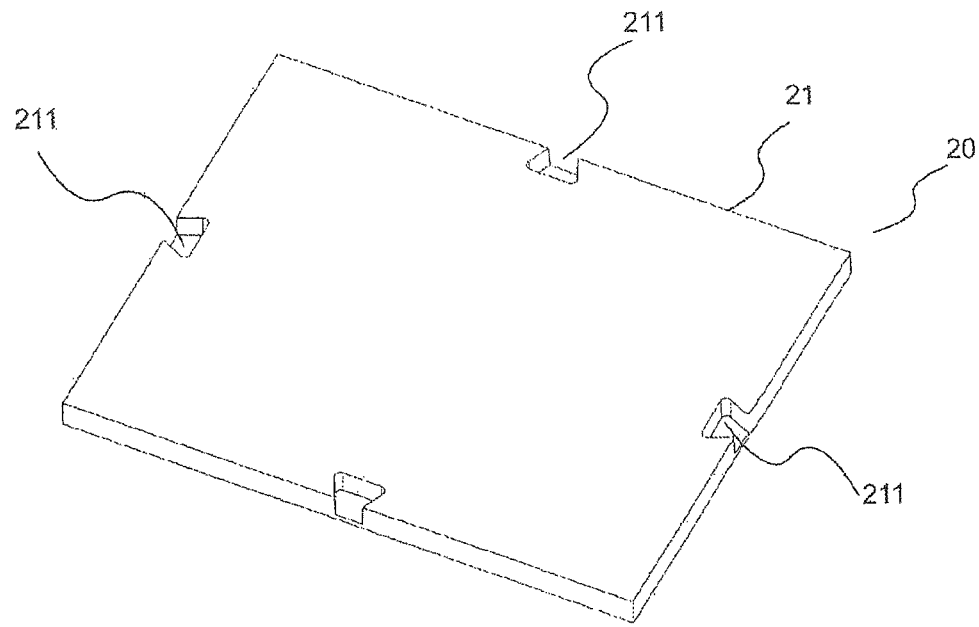

In FIG. 2a, the perspective view of the subject matter floor piece is given.

Figure 2B:
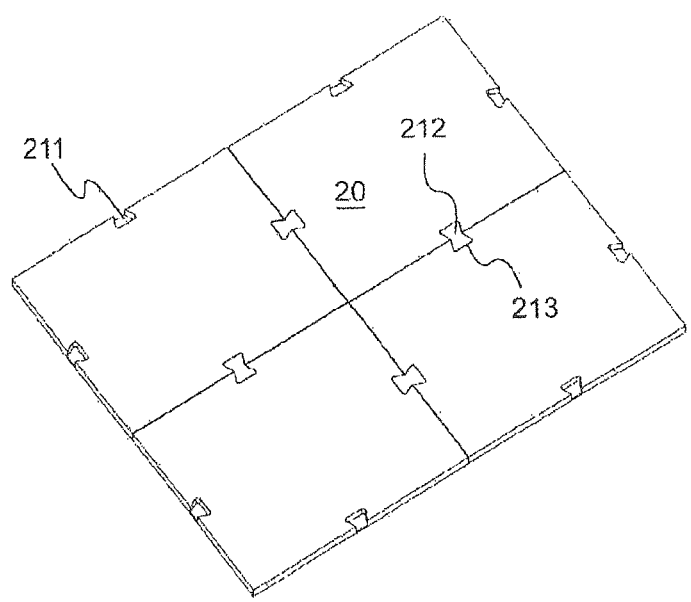

In FIG. 2b, the view illustrating the connection of two floor pieces to each other is given.

Figure 3A:
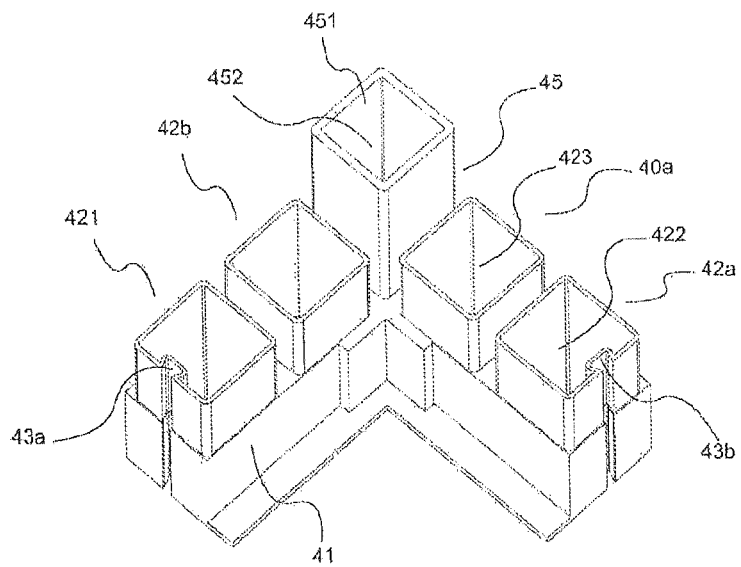
Figure 3B:
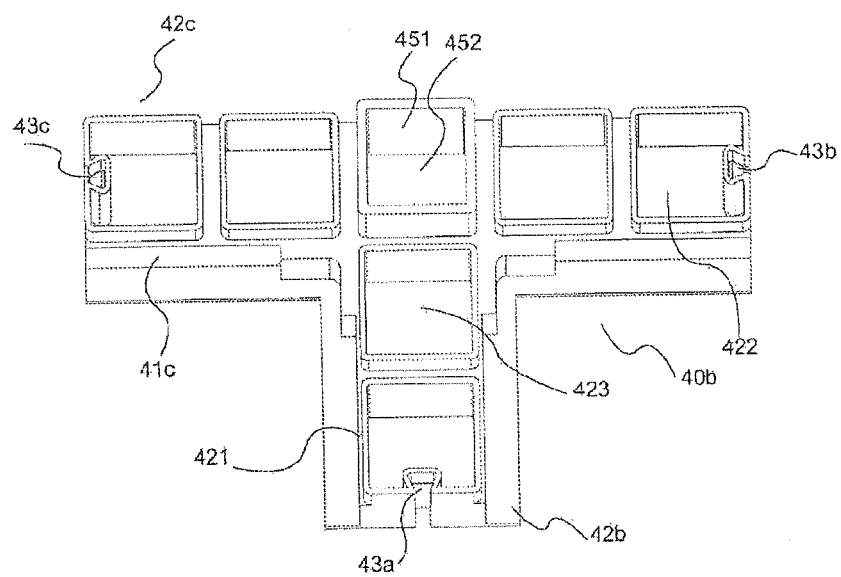
Figure 3C:
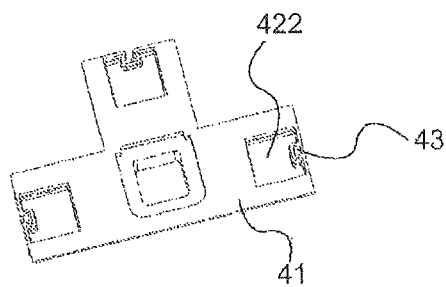
Figure 3D:
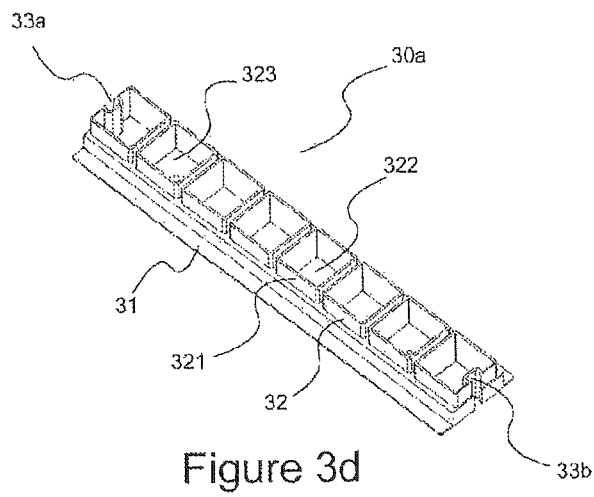
Figure 3E:
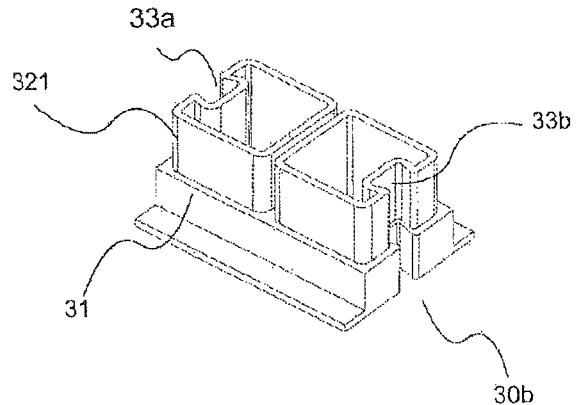

In FIGS. 3a, 3b and 3c, the perspective view of the subject matter column adaptor is given.

In FIGS. 3d, 3e, 3f and 3g, the perspective view of the subject matter wall adaptors is given.

Figure 4A:
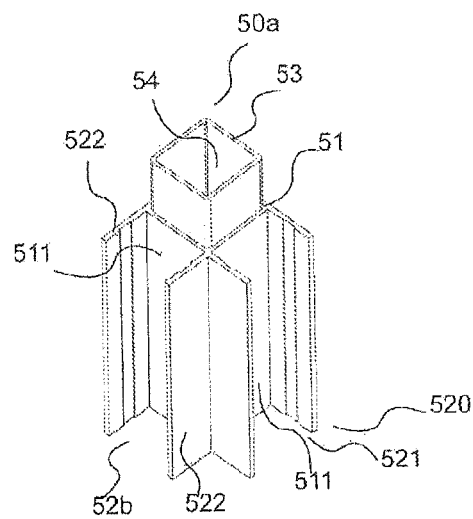
Figure 4B:
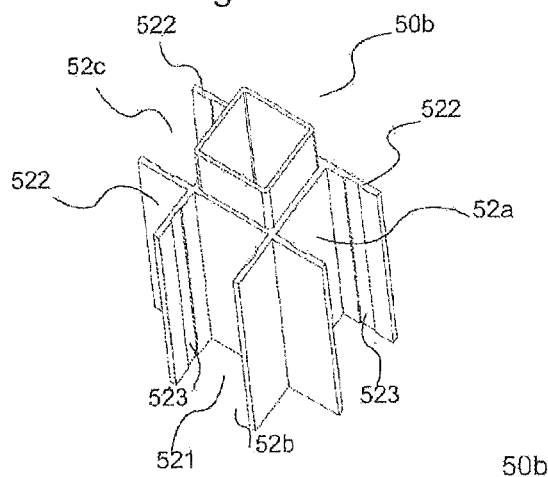
Figure 4C:
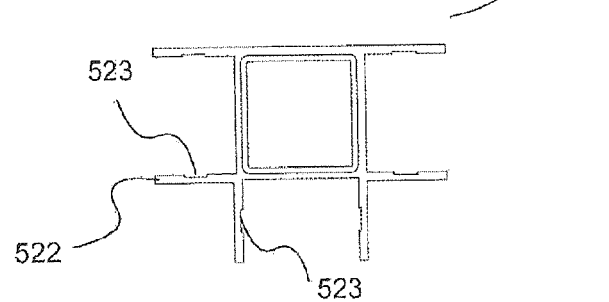

In FIGS. 4a, 4b and 4c, the views regarding the subject matter corner columns are given.

Figure 5A:
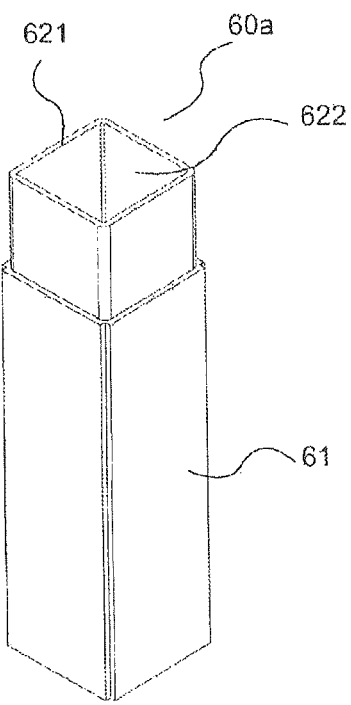
Figure 5B:
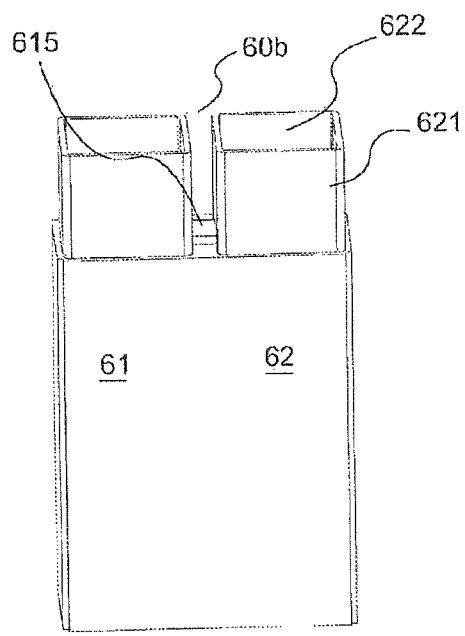
Figure 5C:
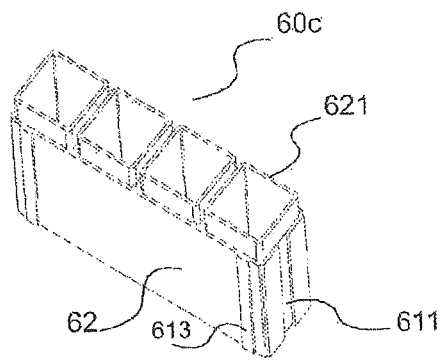
Figure 5D:
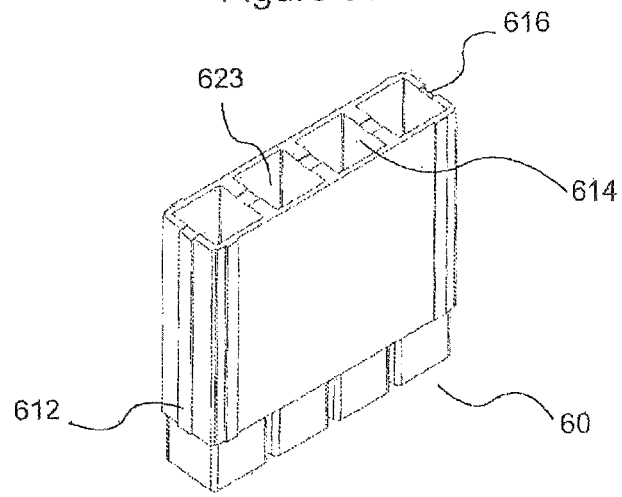
Figure 5E:
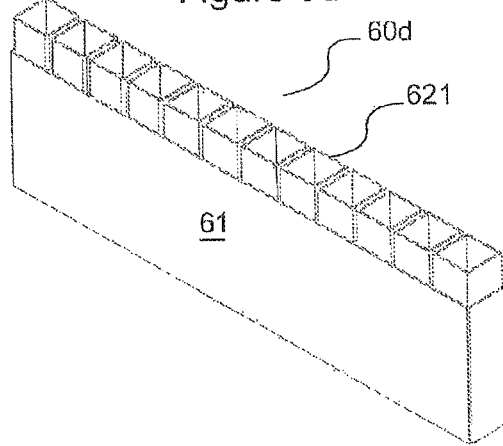
Figure 5F:
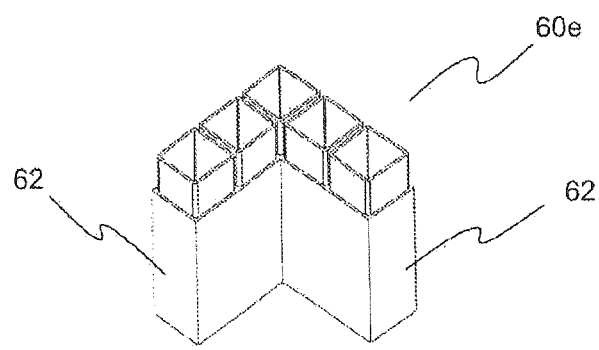
Figure 5G:
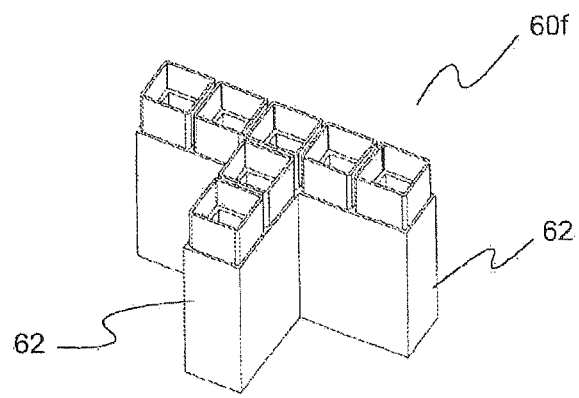
Figure 5H:
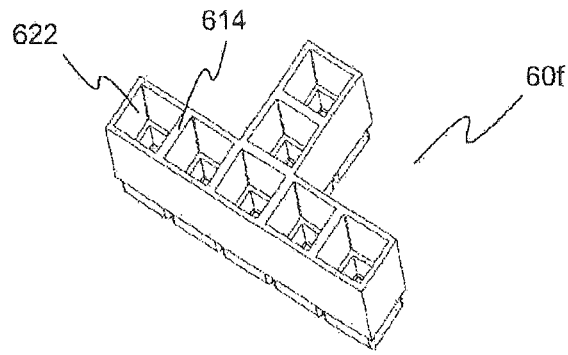

In the figures between FIGS. 5a and 5h, the views regarding the subject matter wall bricks are given.

Figure 6A:
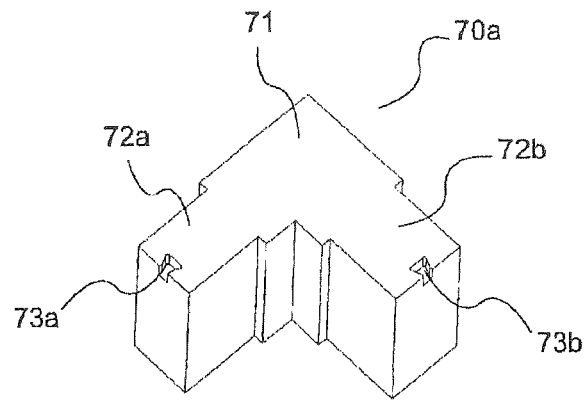
Figure 6B:
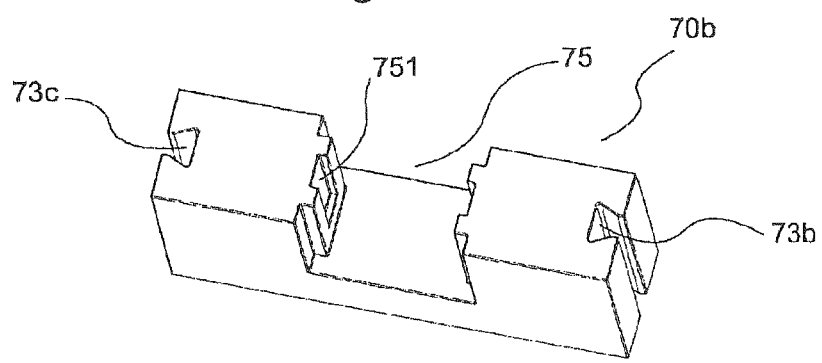
Figure 6C:
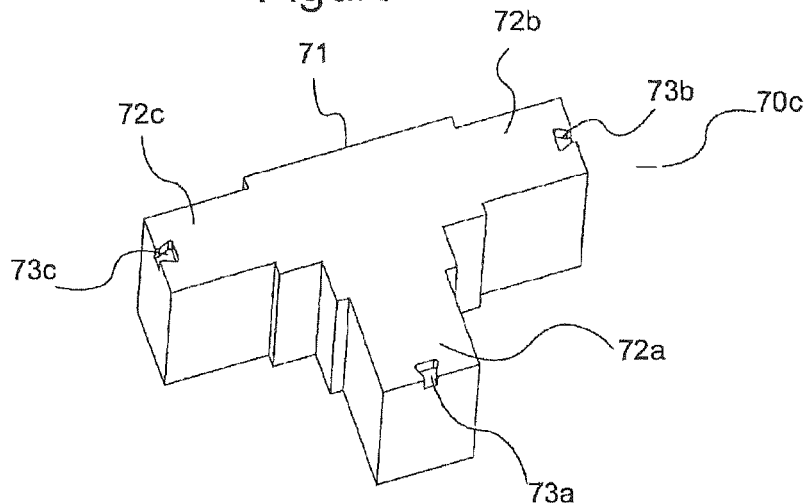

In the figures between FIGS. 6a and 6c, the views regarding the subject matter wall top bricks are given.

Figure 7A:
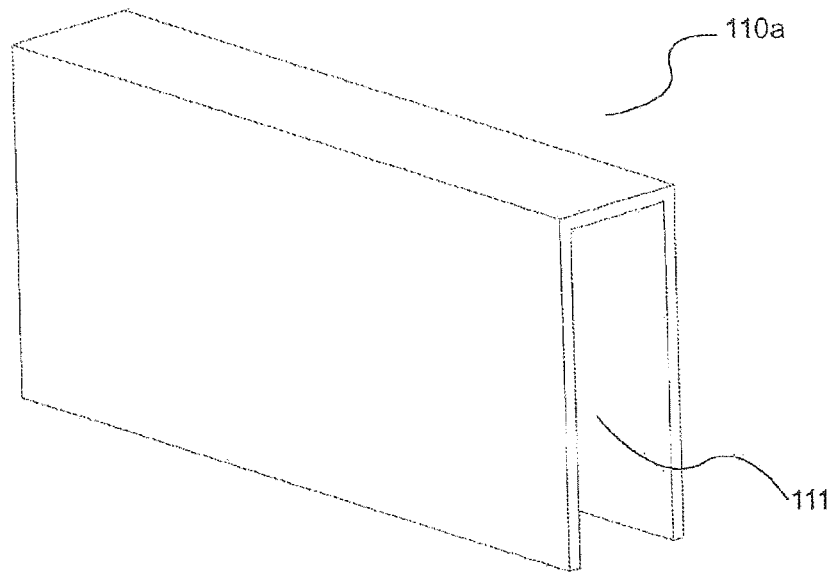
Figure 7B:
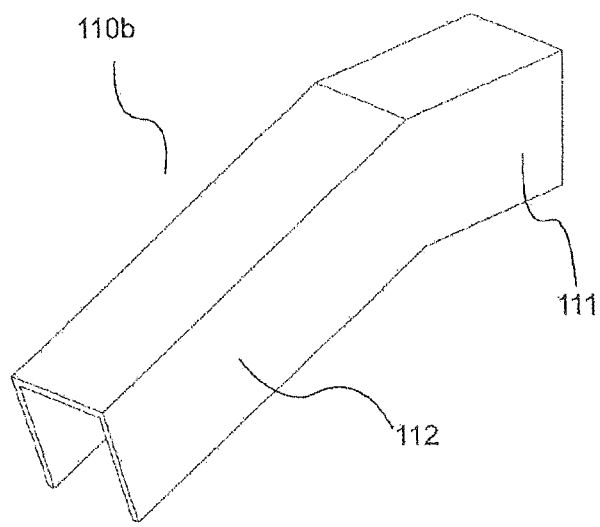

In FIGS. 7a and 7b, the view of the subject matter cover pieces is given.

In FIG. 8a, the view of the subject mater roof coating is given.

In FIG. 8b, the view of the subject mater roof valley is given.

In FIGS. 9a and 9b, the views of the subject matter roof profile are given.

Figure 10A:
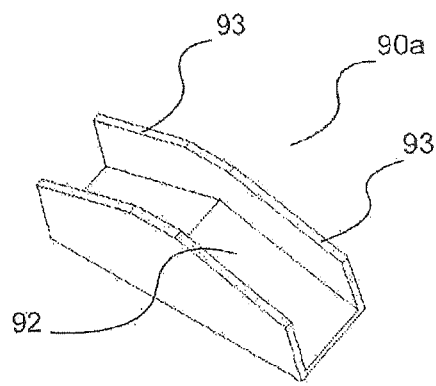
Figure 10B:
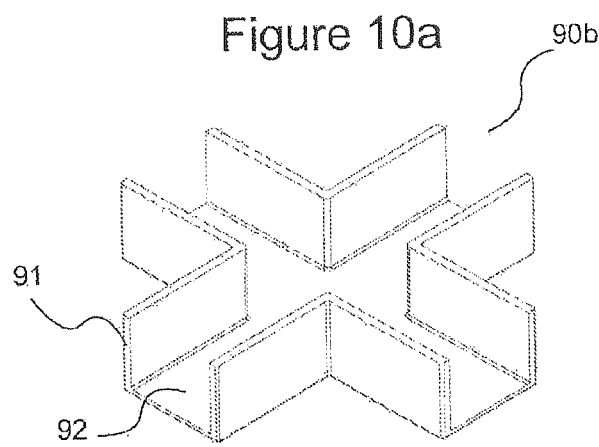

In FIGS. 10a and 10b, the views of the subject matter roof connection adaptors are given.

Figure 10C:
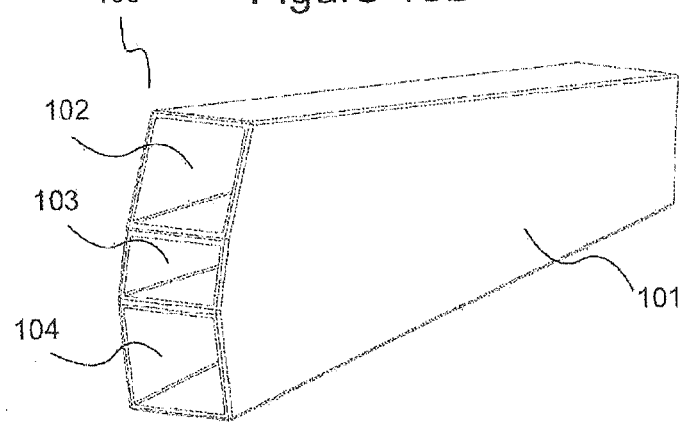

In FIG. 10c, the view of the subject matter eaves adaptor is given.

REFERENCE NUMBERS

10 Building
11 Floor
12 Columns
13 Walls
131 Roof support wall
14 Door opening
15 Window opening
16 Roof truss
17 Roof purlin
18 Anchorage member
19 Connection rope
20 Floor piece
21 Edge
211 Floor Connection recess
212 Floor Connection member
213 Floor Connection housing
30 Wall adaptor
30a Wall adaptor
30b Wall adaptor
30c Wall adaptor
30d Wall adaptor
31 First Body
32 First Wall connection part
321 First Connection extension
322 First Opening
323 Anchorage part
33 First Connection recess
33a First Connection recess
33b First Connection recess
33c First Connection recess
34 First Connection housing
40 Column adaptor
40a Column adaptor
40b Column adaptor
41 Second Body
42 Second Wall connection part
42a Second Wall connection part
42b Second Wall connection part
42c Second Wall connection part
421 Second Connection extension
422 Second Opening
423 Anchorage part
43 Second Connection recess
43a Second Connection recess
43b Second Connection recess
43c Second Connection recess
44 Connection member
45 Column connection part
451 Third Connection extension
452 Third Opening 50 Corner column
50a Corner column
50b Corner column
51 Fourth Body
511 Lateral surface
52 Fourth Wall connection part
52a Fourth Wall connection part
52b Fourth Wall connection part
52c Fourth Wall connection part
521 Fourth Placement housing
522 Housing wall
523 Fixation channel
53 Fourth Connection extension
54 Fourth Opening
60 Wall brick
60a Wall brick
60b Wall brick
60c Wall brick
60d Wall brick
60e Wall brick
60f Wall brick
61 Fifth Body
611 Wall connection channel
612 Wall connection tab
613 Connection tab
614 Compartment wall
615 Set
616 Set housing
62 Fifth Wall connection part
621 Fifth Connection extension
622 Fifth Opening
623 Fifth Connection housing
70 Wall top brick
70a Wall top brick
70b Wall top brick
70c Wall top brick
71 Sixth Body
72 Sixth Wall connection part
72a Sixth Wall connection part
72b Sixth Wall connection part
72c Sixth Wall connection part
73 Sixth Connection recess
73a Sixth Connection recess
73b Sixth Connection recess
73c Sixth Connection recess
74 Connection member
75 Sixth Placement housing
751 Fixation channel
80 Corner profile
81 Seventh Body
82 Seventh Connection extension
83 Seventh Connection housing
90 Roof connection adaptor
90a Roof connection adaptor
90b Roof connection adaptor
91 Support part
92 Ninth Placement housing
93 Angled part
100 Eaves adaptor
101 Body
102 Upper housing
103 Intermediate space
104 Lower housing
105 Connection hook
110 Cover piece
110a Cover piece
110b Cover piece
111 Tenth Placement housing
112 Angled part
120 Roof coating
121 Valley part
122 Connection part
123 Assembly holes
130 Roof valley
131 Connection form
132 Eaves part
133 Rainspout
140 Support

THE DETAILED DESCRIPTION OF THE INVENTION

In this detailed description, the subject matter improvement is explained with references to examples without forming any restrictive effect in order to make the subject more understandable. Accordingly, in the detailed description below, the application of the subject matter invention in the production of a single-floor building is described. However, by means of the subject matter structural members; different structures like multi-floor buildings, overpasses, bridges, lighting posts, wind turbine posts, towers or posts can also be produced.

With reference to FIG. 1a, the subject matter building (10) essentially comprises a floor (11) which is laid onto the ground; columns (12) provided on the floor (11); walls (13) extending between the columns (12); a ceiling (not illustrated in the figure) provided at the end of the walls (13); and a roof provided above the ceiling. On the walls (13), door and window openings (14, 15) are also provided. Such a building (10) can be produced in the form of a toy block by using no connection member (212, 44) like a screw or by using very small number of connection members (212, 44) in some required regions, thanks to the building components with one-piece connection members which are provided in the subject matter invention and whose details will be given below; and this produced building (10) can have the substantial resistance against the drawing, pressure and bending forces which the buildings (10) are subject to, thanks to the particular form of the structural members and thanks to the connection members. In order for FIG. 1a to be simple, in FIG. 1a, it is representatively illustrated that only a wall and the columns (12) in connection with said wall comprise the related structural members. In the real application, all of the columns, the outer and inner walls (13) of the building (10), illustrated in FIG. 1a, are produced using the subject matter structural members.

The floor (11) of the modular building (10) is produced by joining the floor pieces (20) in panel form. With reference to FIG. 2a, the floor pieces (20) preferably have a rectangular panel form; and on each edge (21), there is one or more number of connection recesses (211). Said connection recesses (211) have a cross section which widens from outside towards inside. For instance, in this preferred embodiment, the connection recesses (211) have a trapezoid like cross section whose short edge faces outwardly and this form is similar to the form called wedge form in the related technical field. In this preferred embodiment of the subject matter invention, the upper surface of the connection recesses (211) is open, and in alternative embodiments, the lower surface can be designed to be open.

Accordingly, with reference to FIG. 2b, during application, the floor pieces (20) are positioned so that the connection recesses (211) correspond to each other and afterwards, into the connection housing (213) defined by the two connection recesses (211), a connection member (212), which has geometry so as to complete the form of this housing (213) and which has a form similar to the wedge members, is placed from above. Thus, without using any particular connection member (212) like screw or nail, a firm connection is provided between the floor pieces (20), and the displacement of the floor pieces (20) in the horizontal plane is prevented. In this preferred embodiment of the subject matter invention, the floor pieces (20) have dimensions of 200×75 cm.

The forms of said connection recesses and of the connection members (211, 212) can change provided that a substantially rigid connection is provided. For instance, in an alternative embodiment, a male connection item can be provided in a floor piece and a female connection item can be provided in the adjacent floor piece; and these two pieces can be fixed to each other without using an additional connection member. However, in this case, two different panel moulds should be produced and this increases the costs. On the other hand, the form of the floor pieces (20) can have another suitable form except the panel form. After a floor (11) is laid down on the ground in a desired region in the abovementioned manner, the column adaptors (40a, 40b), which will connect the columns (12) to the floor (11), are positioned at certain points on the floor pieces (20) according to the placement plan of the project. With reference to FIGS. 3a and 3b, in the subject matter invention, two different types of column adaptors (40a, 40b) are used which are produced with respect to the form of the corner column (50a, 50b) to be placed thereon. For instance, in this preferred embodiment of the subject matter invention, the column adaptors (40a, 40b) used have dimensions of 30×30 cm and 30×50 cm with respect to the width and length arrangement respectively.

In more details, the column adaptor (40a), illustrated in FIG. 3a, comprises an L like body (41); two wall connection parts (42a, 42b) which are provided on the arms of the body (41) and whereon the related parts of the wall bricks (60), which will form the walls (13), are placed; and a column connection part (45) which is provided on the corner part of the body (41) and whereon the corner columns (50a) are placed. With reference to the bottom view in FIG. 3c, said body (41) is in full form in order to provide substantial resistance. Said connection parts (42a, 42b) extend horizontally in the form of two arms from the two sides of the body (41) so that there is an angle of 90 degrees in between, thus an L like form is defined. Preferably, each wall connection part (42a, 42b) has at least two connection extensions (421) which are provided at the continuation of each other horizontally and which extend upwardly. Said connection extensions (421), which are provided by cutting out the related parts of the body (41), have a hollow box form so as to define an opening (422).

Preferably, inside the connection extensions (421) adjacent to the body (41), an anchorage part (423) is provided which is in the form of a closed surface. Anchorage members (not illustrated in the figure), which drill the floor (11) and which slide into the ground, are engaged to said anchorage parts (423), thus, the places in the anchorage part (423), except the drilled part, substantially encompass the anchorage member and they provide this connection to be more stabile. On the front surface of the outward facing connection extensions (421), which faces an adjacent wall adaptor (30), one each connection recess (43a, 43b) are provided which have a cross section widening from outside towards inside and which is similar in form with the ones in the floor pieces (20). Said connection recesses (43a, 43b) extend along the bottom body (41) and along the related connection extension (421) so that there is preferably a step in between. Thus, if desired, a firmer connection can also be realized by using two separate connection members (212, 44) which correspond to the connection recess's (43) parts on the body (41) and on the connection extension (421) or by using a single connection member (212, 44) which has a height extending along these two parts.

On the other hand, the column adaptors (40a, 40b) also comprise a column connection part (45) with at least one connection extension (451) which extends upwardly from the middle part of the body (41) and whereon the corner columns (50a, 50b), whose details will be given below, are placed. In order to provide substantial resistance to the drawing and pressure forces, said connection extension (451) has a greater height than the connection extensions (421) regarding the wall bricks (60), and on the other hand, said connection extension (451) has the same square-like cross section. In FIG. 3b, a column adaptor (40b) is illustrated which has a T-like body (41) and which has three wall connection parts (42a, 42b, 42c) provided on this body (41). In a similar manner, the added wall connection part (42c) has connection extensions (421) and a connection recess (43c) with a cross section which widens from outside towards inside. In the alternative embodiments of the subject matter invention, the form of the connection extensions (421, 451) and of the connection recesses (43a, 43b, 43c) of said column adaptors (40a, 40b) can be changed provided that unscrewed connection with desired firmness is provided.

After the abovementioned column adaptors (40a, 40b) are positioned onto the floor (11) in the desired manner, the wall adaptors (30a, 30b), which carry the wall bricks (60) forming the walls (13) extending between the columns (12), are laid down so as to extend between the column adaptors (40a, 40b). In this preferred embodiment of the subject matter invention, in a similar manner to the abovementioned one, two different wall adaptors (30a, 30b) are used which have a box-like body (31) with compartments; and these have the dimensions of 10×80 cm and 10×20 cm according to the width and length arrangement respectively. In more details, with reference to FIG. 3d and FIG. 3e, the wall adaptors (30a, 30b), which can be in different dimensions optionally, comprise a wall connection part (32) which extends in a linear manner and which has pluralities of connection extensions (321) in box-like form whose base and ceiling are open and which are provided in a similar manner to the wall connection parts (42a, 42b, 42c) in the column adaptors (40a, 40b); and said wall adaptors (30a, 30b) also comprise a body (31) which is substantially full and which extends under said wall connection part (32). Preferably in some part of the connection extensions (321) of the long wall adaptors (30a, 30b), anchorage parts (323, 423) are provided for providing stabile connection with the ground and which has a closed surface form and which is in the form of a full surface wherein the anchorage member is engaged. On the other hand, on the front lateral surface (511) of the connection extensions (321) at both ends, one each connection recesses (33a, 33b) are provided which have cross section widening from outside towards inside. Accordingly, with reference to the exemplary illustration in FIGS. 1b and 1d, in a similar manner to the floor (11) application, the desired wall and column adaptors (30a, 40b) are positioned so that the connection recesses (33, 43) correspond to each other. A connection member (44), which is compliant with the form of the connection housing (34) and which is preferably used in the wedge type connections, is placed to the connection housing (34) defined by said connection recesses (33, 43). Thus, without using any metal item or any assembly apparatus, a practical and a very stabile connection can be provided. Thanks to said wall and column adaptors (30a, 40b); the floor (11) becomes ready for the column and the wall to be laid down thereon.

The columns (12) regarding the building (10) is formed by the corner columns (50a, 50b), which are among the subject matter structural members; and the walls (13) are formed by wall bricks (60a, 60b, 60c, 60d). With reference to FIGS. 4a and 4b, in the subject matter invention, preferably two types of corner columns (50a, 50b) are used which have different shapes and/or dimensions and which are produced according to the number of walls which are in connection. For instance, in this preferred embodiment of the subject matter invention, the corner columns (50a, 50b) have dimensions of 10×10×20 cm and 10×10×25 cm according to the width, length and height arrangement respectively. Similar to the other structural members, the corner column (50a), illustrated in FIG. 4a, has a body (51) which has box form whose ceiling and base are open. Preferably on the two adjacent surfaces (511) of said body (51), one each wall connection parts (52a, 52b) are provided. Said wall connection parts (52a, 52b) comprise two housing walls (522) which extend outwardly at a perpendicular angle with respect to the lateral surface (511) to which said wall connection parts (52a, 52b) are related; and said wall connection parts (52a, 52b) also comprise a placement housing (521) defined by said housing walls (522). The corner column (50b), illustrated in FIG. 4b, has an additional wall connection part (52c) which is provided on another edge of the body (51). With reference to FIGS. 4b and 4c, preferably on all the housing walls' (522) surfaces facing each other, one each fixation channel (523) are provided which extend longitudinally. In an alternative embodiment of the subject matter invention, instead of the fixation channel (523), one or more recesses (not illustrated in the figure), which do not extend continuously, can be provided on the housing walls (522). On the other hand, a column connection extension (53) extends from the upper part of the body (51), which has a square-like cross section so as to define an opening (54). The open base of the body (51) defines a connection housing (not illustrated in the figure) wherein the bottom column adaptor (40) is to be placed or the related connection extension (451, 53) of the corner column (50b) is to be placed.

Accordingly, with reference to the exemplary illustration in FIG. 1b, the corner column (50b) at the bottom is placed onto the related column adaptor (40b) so that the connection extension (451) will enter to the connection housing (not illustrated in the figure) on the base of the corner column (50b), and afterwards, the columns (12) of the upper row are positioned one above the other so that the related connection extension (53) will enter into the connection housing of the corner column (50b) at the top part; thus, the columns (12) are formed.

On the other hand, with reference to FIGS. 5a, 5b, 5c and 5d, in the subject matter invention, for the brick requirement in the project, wall bricks (60a, 60b, 60c, 60d) with different dimensions are used. For instance, in this preferred embodiment of the subject matter invention, wall bricks (60a, 60b, 60c, 60d) with dimensions of 10×10×20 cm, 10×20×10 cm, 10×40×20 cm and 10×120×10 cm according to the width, length and height arrangement are used. The wall brick (60a), illustrated in FIG. 5a, has a hollow box-like body (61) and the wall brick (60a) comprises a wall connection part (62) with a box-like wall connection extension (621) which extends upwardly from the body (61) so as to define an opening (622). With reference to FIGS. 5a, 5b and 5e, using the desired length, the wall bricks (60b, 60c, 60d) can comprise wall connection parts (62) with pluralities of wall connection extensions (621) provided at the continuation of each other so that there is a space in between. For instance, the wall brick (60d), which is illustrated in FIG. 5e and which is relatively longer than the others, is particularly used in the lower and the upper edges of the door and window openings (14, 15). With reference to FIGS. 5c and 5d, in such a case, said body (61) extends in a linear manner and it comprises pluralities of compartments in the inner volume thereof which is defined by the compartment walls (614). Said compartments define the connection housings (623) wherein the connection extensions (621) of the bottom wall brick (60c) will be placed. In alternative embodiments, the body (61) can extend in an angled direction as in the column adaptors (40a, 40b).

With reference to FIG. 5b, in the space remaining between the same wall brick (60b) or between the connection extensions (621) of the adjacent wall bricks (60), a set (615) is provided which will partially cover the space. On the other hand, with reference to FIG. 5d, there are set housings (616) which correspond to said set (615) at the lower edge of the compartments regarding the body (61). Thus, when two wall bricks (60) are placed one above the other, the set (615) is placed in the set housing (616). Thanks to this arrangement, the rain drops, or similar liquids, which move downwardly or which move upwardly as a result of the wind, are prevented from entering into the building through the wall bricks (60) in an efficient and practical manner.

Again, with reference to FIGS. 5c and 5d, in order to provide a more stabile connection, on the lateral surfaces (511) of the wall bricks (60) facing each other, wall connection tabs (612) are provided and wall connection channels (611) wherein these tabs (612) are placed are provided. On the other hand, on the related body (51) lateral surface (511) of the wall bricks (60) entering to the placement housings (521) in the corner columns (50a, 50b), column connection tabs (613) are formed which correspond to the fixation channel (523) in the housing wall (522).

Accordingly, with reference to the representative illustration in FIG. 1c and FIG. 1d, while the walls (13) extending between the columns (12) are being formed, first of all, the first row of wall bricks (60a, 60b, 60c, 60d) are laid down on the wall and on the column adaptors (40a, 40b) on the floor (11). While this process is being realized, the related connection extensions (321, 421) in the wall and in the column adaptors (40) are provided to enter into the connection housings (623) on the wall brick (60a, 60b, 60c, 60d) base. The wall bricks (60a, 60b, 60c, 60d), forming the upper row, are positioned one above the other so that the connection extensions (621) will enter into the corresponding connection housings (623) on the wall brick (60a, 60b, 60c, 60d), thus the walls (13) are also formed. On the other hand, during said wall laying down process, the wall connection tab (612) of a wall brick (60) enters into the connection channel (611) of the adjacent wall brick (60).

In addition to this, with reference to FIG. 1d, in the parts where the wall bricks (60a, 60b, 60c, 60d) join with the corner columns (50a, 50b), the column connection tabs (613) provided in the related part of the wall bricks (60a, 60b, 60c, 60d) enter into the fixation channels (523) corresponding to these tabs (613) in the wall placement housings (521) in the corner columns (50a, 50b). As a result, in this manner, using the desired number and desired dimension of wall bricks (60a, 60b, 60c, 60d) and using the desired number and desired dimension of corner columns (50a, 50b), the parts of the building except the roof can be built.

After the walls (13) and the columns (12) are formed, in order for the connection between the wall and the columns (12) to be provided also at the top point, wall top bricks (70a, 70b, 70c) are used which function as a cover connecting the related top wall brick (60) and the related corner column (50a, 50b) to each other from the top. In the subject matter invention, preferably three different types of wall top brick (70a, 70b, 70c) are used whose forms are adjusted according to the usage area. For instance, in this preferred embodiment of the subject matter invention, the wall top bricks (70a, 70b, 70c) have dimensions of 30×30×15 cm, 10×40×15 cm and 30×50×15 cm according to the width, length and height arrangement respectively.

In more details, with reference to FIG. 6a, an wall top brick (70a), used in corner points, comprises a body (71) and one each wall connection parts (72a, 72b) which extend outwardly from two adjacent surfaces of said body (71) so that there is an angle of 90 degrees in between. The upper surface of said wall connection parts (72a, 72b) is closed, and in the lower surface of said wall connection parts (72a, 72b), there is at least one connection housing (not illustrated in the figure) wherein at least one connection extension (621) of the bottom wall brick (60) can enter. On the base part of the body (71) which exists in the middle, there is a column connection housing (not illustrated in the figure) which has a depth so that the column connection extension (53) of the bottom corner column (50a, 50b) can enter. On the other hand, on the outward facing lateral surfaces (511) of the wall connection parts (72a, 72b), one each connection recesses (73a, 73b) are provided which have a part with a cross section which widens from outside towards inside and which is in the form of a wedge. Thus, the wall top brick (70a, 70b, 70c) can be connected to another structural member with a similar connection recess (73a, 73b) using a suitable connection member (74); and particularly the wall top brick (70a, 70b, 70c) can be connected to another wall top brick (70a, 70b, 70c). With reference to FIG. 6c, the wall top brick (70c), which is used together with a corner column (50b) where the three walls are connected, has a T-like form and accordingly, it has an additional wall connection part (72c) and a connection recess (73c) which is provided on this part. With reference to FIG. 6b, another wall top brick (70b), which is fixed onto wall bricks (60a, 60b, 60c, 60d) extending between two columns, extends in a linear manner; and in the middle part thereof, it has a placement housing (75) wherein a structural member used preferably in the roof and wherein particularly an eaves adaptor (100) is seated. In a preferred embodiment of the subject matter invention, there are one each fixation channels (751) on the mutual orthogonal walls defining said placement housing (75).

As a result, the wall top bricks are placed onto the wall bricks and onto corner columns on the upper row with the desired arrangement. Thus, rigid connection between the walls and the columns is provided thanks to the wall adaptors at the bottom and thanks to the wall bricks at the top. For instance, with reference to FIG. 1f, suitable wall bricks (70a, 70b, 70c) are laid down respectively onto a corner column (50a), onto the wall bricks (60) in connection and onto another corner column (50b) in relation with the wall bricks (60). A structural member is seated onto the placement housing (75) of the related wall brick (70b), or the placement housing (75) is covered by a suitable cover for aesthetical purposes. In a preferred embodiment of the subject matter invention, the connection housing (not illustrated in the figure) on the base of the related wall brick is wider than the connection extension (621) of the related wall brick which enters this housing. Thus, the wall top brick (70b) is moved towards left and towards right along the extension direction; and at the desired point, it can be fixed by using a stud element (not illustrated in the figure) or by means of a similar member. This function particularly provides flexibility and easiness during the adjustment of the place of the eaves point. Again, the detailed view of the connection member (74) used in this manner is also given. The connection members (212, 44), used in the other structural members, are preferably in this form.

Figure 3F:
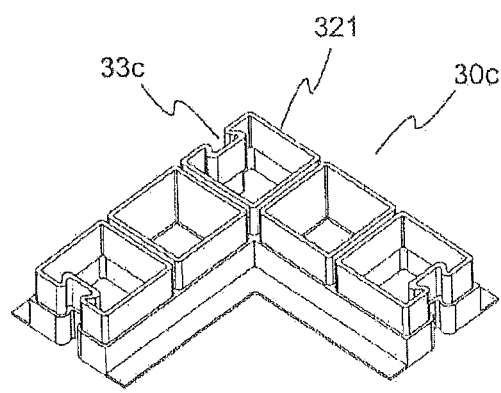
Figure 3G:
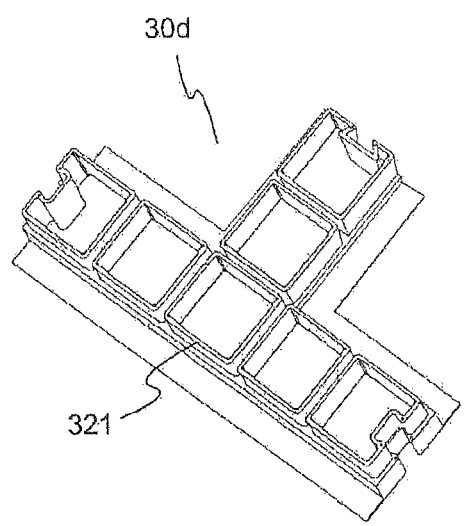

In an alternative application of the subject matter invention, using particularly designed wall adaptors and using wall bricks compliant with these, the building can be built without the need for corner columns (50a, 50b) and without the need for column adaptors (40a, 40b). With reference to FIGS. 3f and 3g, the wall adaptors (30c, 30d) are designed in a similar manner to a column adaptor (40a, 40b) in a manner that there is a normal wall connection extension (321) instead of the column connection extension (451). On the other hand, in the novel connection extension (321) of the related wall adaptor (30c), an additional connection recess (33c) is provided. With reference to FIGS. 5f, 5g and 5h, correspondingly, the related wall bricks (60e, 60f) comprise additional wall connection parts (62) which extend in an angled manner so as to have an L-like and a T-like cross section respectively. Thus, during application, said wall bricks (60e, 60f) are placed to the corresponding wall adaptor (30c, 30d) and thus, the corners or the intermediate compartments of the building are formed. Here, in order to provide the connection between the wall bricks, existing in the corner, and the other wall bricks, the wall bricks are placed one above the other in a sliding arrangement. In more details, for instance, a single wall brick (60a) is placed to the corner part of the related wall brick (60e) existing in the bottom; and for instance a foursome wall brick (60c) is placed to the empty connection extensions (621) remaining on the sides. Thus, some part of said foursome wall brick (60c) is in connection with the wall brick (60e) forming the corner; and the other part is in connection with the wall bricks (60a, 60b, 60c, 60d) forming the wall; thus, the rigid connection in between is provided. On the other hand, the connection arrangement can be adjusted in the desired manner provided that said connection is realized.

After the columns (12) and the walls (13) of the subject matter building are formed completely, the roof of the building can be embodied in a very rapid and rigid manner by using the subject matter structural members. With reference to FIGS. 7a and 7b, in order to provide visual integrity, the above of the wall bricks (60a, 60b, 60c, 60d), existing on the ever-raising upper row, of the roof support wall (131) with a triangular shape is covered by means of suitable cover pieces (110a, 110b). In more details, the wall bricks (60a, 60b, 60c, 60d), existing in the part from the lower elevation to the upper elevation, are covered by means of a cover piece (110a). Said cover piece (110a) has an inverse U-like cross section and it defines a placement housing (111) wherein the wall bricks (60a, 60b, 60c, 60d) can be substantially placed. In addition, the joining point at the top is covered by means of a cover piece (110b) with one each angled parts (112) which extend downwardly from two sides.

With reference to FIG. 10c, another structural member, used in the building of the roof, is the eaves adaptor (100). Accordingly, the subject matter eaves adaptor (100) comprises a triangular body (81); and a lower housing (104) which extends essentially parallel to a long edge inside said body (81); and an upper housing (102) which extends essentially parallel to another long edge. Preferably, between the lower housing (104) and the upper housing (102), an intermediate space (103) is provided. During application, the eaves adaptors are seated to the placement housing (75) of the wall top bricks (70b) extending onto the walls. During this process, the connection tabs (not illustrated in the figure), provided on the lateral surfaces of the eaves adaptor, enter into the mutual fixation channels (751) existing inside the placement housing.

With reference to FIGS. 9a and 9b, the roof truss (16) and the roof purlins, forming the frame of the building, are formed using support profiles comprising a body (81); a connection extension (82) extending at the continuation of the body (81) so as to have a narrower diameter; a connection housing (83) wherein another connection extension (82) can enter at the beginning of the body (81). Said roof profiles (80) have box profile form and accordingly, they have square-like or a rectangular cross section. However, in an alternative embodiment, the connection extension and correspondingly, the connection housing can have a form with a cross section like an ever widening isosceles trapezoid.

Accordingly, with reference to FIG. 1e, during application, a group of roof profiles (80) is laid down so as to extend horizontally with respect to the ground between the front and rear of the ceiling; and the profiles at the end enter into the lower housing (104) of the eaves adaptor (100). Another group of roof profiles (80) is laid down so as to extend at a certain angle upwardly beginning from the upper housing (102) of the related eaves adaptor (100) on the front and rear edge of the ceiling; and they coincide with each other at the upper alignment of the middle point of the ceiling. With reference to FIG. 1e, thus, horizontally and angled extending profiles are laid down so as to define an isosceles triangle like form; and thereby this defines the roof trusses (16). The roof profiles (80) are joined so as to be supported from bottom by a roof connection adaptor (90a) at the upper point. With reference to FIG. 10a, said roof connection adaptor (90a) is used which has angled parts (93) comprising placement housings (92) wherein the related parts of the support profiles, extending in an angled manner in two sides, are placed. On the other hand, a support (140) extends orthogonally to the ground between said roof connection adaptor (90a) and the point where the horizontal support profiles, extending on the ceiling, coincide in the middle; and thus, the roof is supported from the top point. As a result, again with reference to FIG. 1a, these processes are repeated and the roof trusses (16) are laid down on the ceiling.

Afterwards, another group of support profiles extends between the roof support parts (91) in an intersecting manner with the support profiles which extend in an angled manner at certain points; thus, the parts, which are called roof purlin (17) in the related technical field, are defined. The points, where the support profiles forming the roof truss (16) and the roof purlin (17) intersect with each other, are supported from bottom by means of another type of roof connection adaptor (90b). With reference to FIG. 10b, said roof connection adaptor (90b) comprises four support parts (91) where four support profiles are placed and which extends so as to define a + like form and which has placement housings (92). Moreover, the lower end of the support mentioned in the above paragraph is placed to a roof connection adaptor (90b) which is provided at this point. Said roof connection adaptor (90b) also supports the support profiles which extend horizontally with respect to the ground at this point and which coincide in the middle. Preferably, said roof connection adaptor (90b) is fixed to the related roof profile (80) by means of a connection member (212, 44) like a screw. In the alternative embodiment of the subject matter invention, this connection can also be provided by means of the engaged connection methods and in an unscrewed manner.

In the next step, onto the related wall top bricks (70a, 70b, 70c) in the top row of the front and rear side of the building, the roof valleys (130) are fixed. With reference to FIG. 8b, said roof valley (130) has an inverse U cross sectioned connection form (131) in a similar manner to said cover piece (110a); and said roof valley (130) is fixed to the upper part of the wall bricks (60a, 60b, 60c, 60d) from this connection part (122). At the continuation of the connection form (131), there is an eaves part (132) which extends essentially parallel to ground after assembly. At the continuation of the eaves part (132), a rainspout (133) is provided which has a U-like cross section and which extends at a lower elevation when compared with the eaves part (132). Moreover, at the two ends of the connection form (131), one each cut parts (134) are provided and during application, the related part of the eaves adaptor (100), which places to the wall top brick (70b), enters into region defined by these cross sectional parts.

Preferably, after the roof valleys (130) are laid down, the ceiling part of the building is also provided on the walls and on the columns (12). Said ceiling part is formed by using pluralities of ceiling pieces (not illustrated in the figure) which can be connected to each other in an engaged manner and which are in the form of plates. For instance, in a preferred application, the ceiling pieces extend between the two roof support parts (131) and at certain points, the ceiling pieces are fixed from the bottom side to the horizontal roof profiles (80) regarding the roof trusses (16). In order to provide substantial resistance, preferably between two roof support parts, pluralities of ceiling pieces extend at the continuation of each other. Since the laying down type and engaged connection type of the ceiling pieces is preferably the same as the laying down type of the units like parquet, it will not be given in detail here. In a preferred embodiment of the subject matter invention, the thickness of a ceiling piece is around 3 mm, and optionally this thickness value can be increased.

Finally, the roof coatings (120) which have valley parts (121) are laid down onto the roof trusses (16) and onto the roof purlins (17) which are formed by support profiles. A connection part (122) is provided which extends along a long edge of each roof coating (120) and which has assembly holes (123) thereon. Said connection part (122) has a smaller thickness when compared with the remaining of the roof coating (120) and a depression is defined thanks to this form. Thanks to this, the related edge of the next roof coating (120) seats to said depression, thus, between the two roof coatings (120), a tab, which deteriorates the visual appearance, is not formed. Moreover, said connection parts (122) have assembly holes (123) and thanks to this, the two roof coatings (120) can be connected to each other by means of a connection member (212, 44) like a screw. In the alternative embodiment of the subject matter invention, the roof coatings (120) can comprise connection recesses (73a, 73b) as in the floor (11) panels; and the roof coatings (120) can be connected to each other by means of a suitable connection member (212, 44). On the other hand, adjacent roof coatings (120) can comprise male and female connection members and the connection can also be realized in this manner. As a result, using the related composite structural members, the roof of the building is produced in a flawless manner.

With reference to the representative frontal view of a part of a building in FIG. 1g, the connection of the roof with the remaining of the building or the connection of the roof with the floor is provided in the following manner. Preferably, on the eaves adaptors (100), a connection hook (105) or a similar connection member is provided; and a fiber cable (19), whose one end is fixed to this connection hook (105), is swung downwardly through a line defined by the vertical openings (622) on the wall bricks. At the bottom point, it is fixed to an anchorage member (18) which is fixed to the anchorage part (323) of a related wall adaptor (30a) of said fiber cable and which reaches the ground by drilling the floor piece (20). Thus, using desired number of fiber cables (19) in the desired point, the connection between the roof and the ground is provided in a very rigid manner.

In the alternative embodiments of the subject matter invention, the one-piece connection members of the subject matter and the abovementioned structural members can be optionally revised by other connection items, which will provide unscrewed and hand tools-free connection. Unscrewed and hand tools-free connection systems like snap-fit, shape coupling, wedge connection, tabbed connection can be given as an example to these connection items.

As can also be seen from the abovementioned description, the bodies (31, 41, 51, 61) of the related structural members and particularly of the load carrying members like wall bricks, corner column, column adaptor and wall adaptor comprise at least one opening (322, 422, 452, 54, 622) extending along the body height and they preferably have box like form with or without compartments. This form increases the resistance of the related structural member and at the same time it provides heat and noise insulation with the outer environment without the need for an additional insulation mean. Moreover, members like a building's electrical cables and telephone cables or the sanitary system pipes can be passed through these openings (322, 422, 452, 54, 622), and this is a big advantage which accelerates the building process.

In an alternative embodiment of the subject matter invention, in bodies (31, 41, 51, 61, 71, 81, 101) comprising pluralities of compartments, additional openings (not illustrated in the figure), providing passage between compartments, can also be provided on the compartment walls (614). Thus, horizontally extending channels are also defined and in these channels, again it can facilitate laying down of members like cable or pipe.

In other alternative embodiments of the subject matter invention, the form of said bodies (31, 41, 51, 61) can be different provided that the desired resistance and shape compliancy are preserved. For instance, instead of the forms like "box with opening" in the subject matter invention, bodies which are completely full or full bodies with narrow horizontal or vertical channels or bodies which are connected to each other in a manner and which comprise at least two panels or steel reinforced bodies or bodies which have pores and which have chambers or which are in cage form can also be preferred.

All of the structural members, used in the subject matter invention, are made of a material based on the material called SMC (sheet molding composites) and all of the structural members are produced by a production method known in the related art. Accordingly, in a compliant manner to the hot pressing production, some structural members in the subject matter invention can comprise two pieces which are symmetrical to each other and which form the structural member when joined. For instance, the roof profiles (80), which preferably have a square-like cross section, are formed by joining two pieces which have U cross section. When required, optionally the other structural members and particularly the cover pieces (110a, 110b) can be produced in this manner.

Accordingly, in a preferred formulation, said composite material comprises fiber at a proportion of 25-33% in order to provide resistance, at least one type of mineral powder as filling material with a proportion of 40-50%, resin with a proportion of 20-25% as binding member between the fiber and filling material, and at least one chemical additive with a proportion of 5-8%. In the parts like corner columns (50a, 50b), in order to obtain a material which particularly has the mechanical properties of steels of type ST 52 and which is relatively resistant, vinyl ester resin is used as resin and carbon fiber is used as fiber. In the parts like roof valleys (130) and roof coatings (120), where there is no need for a high resistance, in order to obtain a material which has the mechanical properties of steels of type ST 37, isophtalic resin is used as resin and glass fiber is used as fiber. For the structural members like the wall bricks (60a, 60b, 60c, 60d) which require middle level of resistance, isophtalic resin is used as resin and aramid fiber is used as fiber and thus, a material, which has the mechanical properties of steels of type ST 42 can be obtained. Preferably, the thickness of the subject matter structural members can be 4 mm and 2 cm depending on the desired resistance.

On the other hand, as the filling material, the subject matter invention comprises at least one type of mineral powder which is selected from a mineral group comprising silisium dioxide, barite, talc and calcite; and as chemical additive, the subject matter invention comprises at least one of the chemicals increasing resistance to abrasion, resistance to flame and increasing water absorption. In addition to these, said formulation can also comprise thermoplastic material at a predetermined proportion in order to improve the visual appearance of the surface.

As known, the forces, which a building is subject to, can be grouped under 5 topics, namely, drawing force, pressure force, momentum force, cutting force and twisting force. A building can be subject to one or more than one of these forces at the same time as a result of pluralities of outer influences like earthquake, wind and the own weight of the building; and the buildings should be made resistant to such cases up to a certain degree. Accordingly, below is given the general description of the response of a building against these forces, which is produced using the subject matter structural members.

First of all, the composite material, from which the structural members are produced, is a material which is as resistant as steel, and at the same time said composite material is 6 times lighter than steel. On the other hand, the porous body structure used in the subject matter invention decreases the weight of the structural members much more. Thus, the component of the momentum force (F6) resulting from the own weight of the building is at a very low level when compared with the concrete or steel structures. If the building is subject to a pressure force (F3, F4), the items, like the connection channel (611) on the lateral surfaces (511) of the adjacent wall bricks (60a, 60b, 60c, 60d) and the connection tab (612) entering into this channel, the connection housings (613) existing in the wall bricks (60a, 60b, 60c, 60d) which are placed one above the other and the connection extensions (621) entering into the connection housings (613) and moreover the housing walls (522) in the corner columns (50a, 50b), provide the building to be more resistant to said pressure forces (F3, F4). In case a drawing force (F1, F2) is formed, the items, like the connection housings (613) existing in the wall bricks (60a, 60b, 60c, 60d), the connection extensions (621) entering into the connection housings (613) and moreover the fixation channel (523) at the corner columns (50a, 50b) and the connection tabs (613) at the wall bricks entering the fixation channel (523, 751), provide the building to be more resistant to said pressure forces (F3, F4). In case of a cutting force (F1, F2 or F2, F4), the items in the pressure force become active, and in addition to this, the flexibility, provided by means of the unscrewed connection, provides a serious advantage. For instance, when a momentum force (F5) or a twisting force (F7) is formed because of for instance like wind; again the items, providing resistance to the pressure forces, and the flexibility provided by means of the unscrewed connection become active. Moreover, the connection members (212, 44) and the connection recesses (33, 43) in wedge form, which provide the related structural members to be connected to each other, play an important role for the resistance of the building against all of these forces. With reference to FIG. 1a, since the wall bricks (60) are laid down by being slid in each row, a wall brick (60), which exists in the upper part, support the connection of two wall bricks (60) which exist in the lower part; and this provides a more rigid building.

Moreover, the subject matter structural members do not comprise pluralities of layers with different physical and chemical properties as in the prior art, and this provides the subject matter structural members and a building produced using these members to be substantially rigid. Moreover, thanks to this, production is facilitated and production can be realized in a more rapid manner, and these are important advantages.

Some of the test data of a subject matter building component obtained by an exemplary formulation is as follows:

| Tests | Test Method | Values |
| --- | --- | --- |
| Determination of the Bending Resistance (N/mm$^2$) | TS 985 EN ISO 178 | ≥160 |
| Determination of the Drawing Resistance (MPa) | EN ISO 527-4 | ≥222 |
| Impact Resistance (kj/m$^2$) | EN ISO 179 | ≥110 |
| Barcol Hardness | EN59 | 70 |
| Water absorption (%) | TS 702, ISO 62 | Maximum 0.15% in 24 hours |
| Density (gr/cm$^3$) | TS 1818, ASTM D792 | 1.79 |
| Chemical Resistance (60% toluene and 40% n-heptane in volume or in diesel, under conditions of 168 ± hours in 23 ± 2° C.) (TS 1478 EN 124 Annex E) | EN ISO 14125 | Change in weight is maximum 0.5% Change in bending resistance is equal to −20% Change in bending module is equal to −30% |
| Surface Resistance (Ω) | DIN IEC 93 | $5 \times 10^9$ |
| Volume Resistance (Ω) | DIN IEC 93 | $5 \times 10^{10}$ |
| Specific transition resistance (Ω · cm) | DIN IEC 93 | $1 \times 10^{12}$ |
| Ball Pressure Test | | Track Diameter maximum 2 mm. |
| Glow Wire Test | | There is no dripping. |
| Accelerated Heat Damping Test | | There is no puncture and deformation |
| Insulation Test | | There is no discharge and deformation |
| Test Measuring Resistance to Temperature Changes | | There is no deformation and crack. |
| Test Measuring Resistance to Ultraviolet Rays | | There is no deformation and crack. |

On the other hand, buildings built according to the subject matter are different from masonry buildings. The buildings which are built according to the subject matter invention have walls (13) functioning as a carrier like in the buildings which are built according to the tunnel formwork method and this provides the building to be much more resistant. On the other hand, in the structures which are produced by means of tunnel formwork method, the inner walls are built by means of masonry for decreasing the costs, and in the subject matter invention, the walls (13) forming the rooms realize the carrying function in the same manner. Moreover, as mentioned above, thanks to the rigid connection between the corner column (50a, 50b) and the walls (13), when the building is subject to the abovementioned loads, the corner angle is not deteriorated, however, in prefab buildings or in the buildings realized by the tunnel formwork method, the corner angle is deteriorated. Thus, the non-deteriorated corner formation, between at least two walls which extend orthogonally to each other, is possible thanks to the particular connection between the wall bricks (60a, 60b, 60c, 60d) and the corner columns (50a, 50b). In relation to this, in a different manner from the masonry buildings, the columns (12) in the subject matter invention support the building against horizontal loads in addition to the vertical loads.

Moreover, in the related tests realized, it is observed that in the glow wire test, there is no dripping; there is no puncture and deformation in the accelerated heat damping test; and there is no deformation and discharge in the insulation test. In addition to these, in the test measuring resistance to temperature changes and in the test measuring resistance to ultraviolet rays, it is observed that there is no deformation and crack in the subject matter structural members.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A modular building which is built by joining composite structural members, wherein the structural members, are made of a composite material comprising at least one type of fiber and at least one type of resin, comprising:
   at least two floor pieces where each of the floor pieces comprises at least one floor connection recess on at least one side and which are positioned with respect to each other where one of the floor pieces corresponds to the floor connection recess of another floor piece to define a floor connection housing; and a floor connection member which is placed to said floor connection housing, at least two wall adaptors which are placed onto a floor defined by said floor pieces and which comprise a first body with at least one first opening, at least one first connection extension extending upwardly from said first body and which comprise at least one first connection recess provided on at least one lateral surface of the first body and the wall adaptors are positioned side by side to define a first connection housing and where one of the wall adaptors corresponds to the first connection recess of the other wall adaptor; and a connection member which is placed to said first connection housing, at least one wall brick which has a fifth body with at least one fifth opening and which has at least one fifth connection housing provided on a base of said fifth body and which has a fifth connection extension extending upwardly from the fifth body and which is placed on the at least two wall adaptors so that the first connection extension thereof enters into said fifth connection housing.

2. The building according to claim 1, wherein the at least two wall adaptors comprise at least one first wall connection part which has said first connection extensions which are provided side by side so that there is a space in between.

3. The building according to claim 1, wherein the at least two wall adaptors comprise at least two first wall connection parts which extend at a certain angle with respect to each other.

4. The building according to claim 3, wherein said at least two first wall connection parts extend with respect to each other to define the wall adaptor which is in an L like or a T like form.

5. The building according to claim 1, wherein the at least one wall brick comprises at least one fifth wall connection part which has said fifth connection extensions which are provided side by side so that there is a space in between.

6. The building according to claim 1, wherein the at least one wall brick comprises at least two fifth wall connection parts which extend at a certain angle with respect to each other.

7. The building according to claim 6, wherein said at least two fifth wall connection parts extend with respect to each other to define the wall brick which is in an L like or a T like form.

8. The building according to claim 1, wherein the at least one wall brick comprises at least one wall connection channel and/or wall connection tab provided on at least one lateral surface thereof facing another horizontally adjacent wall brick.

9. The building according to claim 1, wherein there is a second body which is placed onto the floor defined by the floor pieces and which has at least one second opening; at least one second connection extension which extends upwardly from said second body; a column connection extension which extends upwardly from the second body and which has a height greater than said second connection extension; at least one column adaptor which has at least one second connection recess provided on at least one lateral surface of the second body and which is positioned so as to correspond to the first connection recesses of the at least two wall adaptors to define the connection housing; and the connection member which is placed to the first connection housing.

10. The building according to claim 9, wherein the at least one column adaptor comprises at least one second wall connection part which has the second connection extensions provided side by side so as to have a space in between.

11. The building according to claim 9, wherein the at least one column adaptor comprises at least two second wall connection parts extending at a certain angle with respect to each other.

12. The building according to claim 11, wherein said second wall connection parts extend with respect to each other to define the column adaptor which is in an L like or a T like form.

13. The building according to claim 9, wherein there is a fourth body which is placed on the at least one column adaptor and which is in connection with the at least one wall bricks from at least one side thereof and which has at least one fourth opening; at least one fourth connection extension which extends upwardly from said fourth body; at least one fourth connection housing which is provided on a base of the fourth body and wherein the fifth connection extension of the at least one wall brick enters; two housing walls which extend mutually outwardly from at least one lateral surface of the fourth body; and at least one corner column which is defined by said housing walls and which comprises at least one fourth placement housing wherein at least some part of the fifth body (61) is placed.

14. The building according to claim 13, wherein the at least one fourth placement housing comprises at least one fixation channel which is provided on at least one of the housing walls.

15. The building according to claim 14, wherein there is at least one connection tab which is provided on at least one lateral surface of the fifth body so as to enter into said fixation channel.

16. The building according to claim 1 further including at least one wall top brick comprising a sixth body; at least one top brick connection housing which is provided on a base of said sixth body; and at least one sixth connection recess provided on at least one lateral surface of the sixth body, said wall top brick is positioned so as to connect at least two adjacent wall bricks to each other or so as to connect an adjacent wall brick and an adjacent corner column to each other from above and is positioned so that the related fourth connection extensions and fifth connection extensions enter into said top brick connection housing.

17. The building according to claim 16, wherein the at least one wall top brick comprises at least two sixth wall connection parts which extend at a certain angle with respect to each other.

18. The building according to claim 17, wherein said sixth wall connection parts extend with respect to each other to define the wall top brick in an L like or a T like form.

19. The building according to claim 17, wherein the at least one wall top brick comprises a sixth placement housing whereon the body of another structural member will be placed from above.

20. The building according to claim 19, wherein there is an eaves adaptor which is placed to said sixth placement housing to extend orthogonally to the extension direction of the related wall top brick and which has an upper housing extending in an angled manner in this direction and which has a lower housing extending in a substantially horizontal manner with respect to the ground.

21. The building according to claim 20, wherein there are pluralities of roof profiles which have a seventh connection extension and which have a seventh connection housing wherein said seventh connection extension of another roof profile can enter, and which are engaged to each other to form roof trusses of the building and where ends of the roof profiles, which are in the lower elevation, enter into said upper and lower housings respectively.

22. The building according to claim 21, wherein there are additional roof profiles which have the seventh connection extension and which have the seventh connection housing wherein the seventh connection extension of another roof profile can enter, and which are engaged to each other to form roof purlins of the building and which intersect with the roof profiles regarding the roof trusses at some points.

23. The building according to claim 22, wherein there is at least one roof valley which has a connection form with inverse U cross section placed to the wall top bricks; an eaves part which extends essentially parallel to the ground after assembly at a continuation of said connection form; and which has a rainspout.

24. The building according to claim 23, wherein in the regions where the roof profiles, forming the roof trusses and roof purlins, intersect with each other, there is at least one roof connection adaptor with a support part comprising a ninth placement housing which will support the roof profiles.

25. The building according to claim 22, wherein there is a roof coating with a connection part which is connected to another roof coating as a connection item and which is coated onto the roof trusses and roof purlins defined by the roof profiles.

26. The building according to claim 23, wherein there is a cover piece which has a tenth placement housing and which is placed onto the at least one wall bricks or onto the at least one wall top bricks in desired points.

27. The building according to claim 1, wherein, all of the structural members are made of a composite material comprising at least one type of fiber with a proportion of 25-33% to provide resistance; at least one type of mineral powder with a proportion of 40-50% to be used as filling material; at least one type of resin with a proportion of 20-25% to be used as the member binding fiber to filling material; and at least one chemical additive with a proportion of 5-8%.

28. The building according to claim 27, wherein, in order to obtain a material with the mechanical properties of steels of type ST 50 and above, vinyl ester resin is used as resin and carbon fiber is used as fiber.

29. The building according to claim 27, wherein, in order to obtain a material with the mechanical properties of steels between ST 33 and ST 42, orthophthalic resin is used as resin and glass fiber is used as fiber.

30. The building according to claim 27, wherein in order to obtain a material with the mechanical properties of steels between ST 42 and ST 50, isophtalic resin is used as resin and aramid fiber is used as fiber.

31. The building according to claim 27, wherein the filling material comprises at least one type of mineral powder which is selected from a mineral group consisting of silisium dioxide, barite, talc and calcite.

32. The building according to claim 27, wherein the chemical additive comprises at least one of the chemicals increasing resistance to abrasion, resistance to flame and increasing water absorption; and optionally comprises predetermined amount of thermoplastic material adapted for improving surface appearance.

* * * * *